(12) United States Patent
Newman et al.

(10) Patent No.: US 8,416,188 B2
(45) Date of Patent: Apr. 9, 2013

(54) SYSTEM FOR CONTROLLING MOVEMENT OF A CURSOR ON A DISPLAY DEVICE

(75) Inventors: Andrew Timothy Robert Newman, Balmain (AU); Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 857 days.

(21) Appl. No.: 12/015,508

(22) Filed: Jan. 17, 2008

(65) Prior Publication Data
US 2008/0273010 A1 Nov. 6, 2008

Related U.S. Application Data

(60) Provisional application No. 60/888,775, filed on Feb. 8, 2007.

(51) Int. Cl.
G09G 5/00 (2006.01)
G09G 5/08 (2006.01)
G06F 3/033 (2006.01)
G06F 3/048 (2006.01)
G06F 3/041 (2006.01)
G06K 11/06 (2006.01)
G08C 21/00 (2006.01)

(52) U.S. Cl.
USPC ........... 345/158; 345/156; 345/157; 345/166; 345/179; 715/856; 715/857; 715/858; 178/18.01; 178/18.02; 178/19.01; 178/19.04; 178/19.05

(58) Field of Classification Search .......... 345/156–184; 715/856–862; 178/18.01–20.04
See application file for complete search history.

(56) References Cited

U.S. PATENT DOCUMENTS 4,864,618 A 9/1989 Wright et al.
5,051,736 A 9/1991 Bennett et al.
(Continued)

FOREIGN PATENT DOCUMENTS

GB 2306669 A 5/1997
JP 2005-283445 A 10/2005
(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1996, Springer Verlag LNCS 1375, pp. 392-406.

*Primary Examiner* — Bipin Shalwala
*Assistant Examiner* — Ilana Spar

(57) ABSTRACT

A system for controlling movement of a cursor on a display device, the system comprising: a substrate having a position-coding pattern disposed on or in a surface thereof; a sensing device comprising: an image sensor for optically imaging the position-coding pattern; and a processor configured for: generating absolute motion data by determining a plurality of absolute positions of the sensing device relative to the surface using the imaged position-coding pattern; generating orientation data indicative of an orientation of the sensing device relative to the substrate; and using the orientation data to translate the absolute motion data into relative motion data, said relative motion data being indicative of relative motion of the sensing device from the perspective of a user; and communication means for communicating the relative motion data to a computer system; and the computer system configured for: receiving said relative motion data from the sensing device; interpreting said relative motion data as cursor movement; and generating cursor control commands for said display device.

17 Claims, 18 Drawing Sheets

U.S. PATENT DOCUMENTS

| | | |
|---|---|---|
| 5,477,012 A | 12/1995 | Sekendur |
| 5,652,412 A | 7/1997 | Lazzouni et al. |
| 5,661,506 A | 8/1997 | Lazzouni et al. |
| 5,692,073 A | 11/1997 | Cass |
| 5,852,434 A | 12/1998 | Sekendur |
| 6,076,734 A | 6/2000 | Dougherty et al. |
| 6,330,976 B1 * | 12/2001 | Dymetman et al. .......... 235/487 |
| 6,592,039 B1 | 7/2003 | Smith et al. |
| 6,681,045 B1 * | 1/2004 | Lapstun et al. ............... 382/187 |
| 6,964,374 B1 | 11/2005 | Djuknic et al. |
| 7,048,198 B2 | 5/2006 | Ladas et al. |
| 7,342,575 B1 * | 3/2008 | Hartwell et al. .............. 345/179 |
| 7,760,190 B2 * | 7/2010 | Yeh ................................ 345/173 |
| 2004/0070616 A1 | 4/2004 | Hildebrandt et al. |
| 2005/0200610 A1 | 9/2005 | Skantze et al. |
| 2006/0007183 A1 | 1/2006 | Ericson et al. |
| 2006/0139338 A1 * | 6/2006 | Robrecht et al. .............. 345/175 |
| 2008/0129711 A1 | 6/2008 | Bergstrom et al. |

FOREIGN PATENT DOCUMENTS

| | | |
|---|---|---|
| JP | 2005283445 A * | 10/2005 |
| WO | WO 99/18487 A2 | 4/1999 |
| WO | WO 99/50787 A1 | 10/1999 |

* cited by examiner

SYSTEM FOR CONTROLLING MOVEMENT OF A CURSOR ON A DISPLAY DEVICE

FIELD OF INVENTION

The present invention relates to a method and system for reading a position-coding pattern disposed on a surface. It has been developed primarily to improve the functionality of sensing device used for reading the position-coding pattern.

COPENDING

The following applications have been filed by the Applicant simultaneously with the present application:

12015507   12015509   12015510   12015511   7971784   7878404

The disclosures of these co-pending applications are incorporated herein by reference.

CROSS REFERENCES

The following patents or patent applications filed by the applicant or assignee of the present invention are hereby incorporated by cross-reference.

| | | | | | | |
|---|---|---|---|---|---|---|
| 6,276,850 | 6,520,631 | 6,158,907 | 6,539,180 | 6,270,177 | 6,405,055 | 6,628,430 |
| 6,835,135 | 6,626,529 | 6,981,769 | 7,125,338 | 7,125,337 | 7,136,186 | 7,286,260 |
| 7,145,689 | 7,130,075 | 7,081,974 | 7,177,055 | 7,209,257 | 6,443,555 | 7,161,715 |
| 7,154,632 | 7,158,258 | 7,148,993 | 7,075,684 | 10/943,905 | 10/943,906 | 10/943,904 |
| 10/943,903 | 10/943,902 | 6,966,659 | 6,988,841 | 7,077,748 | 7,255,646 | 7,070,270 |
| 7,014,307 | 7,158,809 | 7,217,048 | 11/225,172 | 11/255,942 | 11/329,039 | 11/329,040 |
| 7,271,829 | 11/442,189 | 11/474,280 | 11/483,061 | 11/503,078 | 11/520,735 | 11/505,858 |
| 11/525,850 | 11/583,870 | 11/592,983 | 11/592,208 | 11/601,828 | 11/635,482 | 11/635,526 |
| 10/466,440 | 7,215,441 | 11/650,545 | 11/653,241 | 11/653,240 | 7,056,040 | 6,942,334 |
| 11/706,300 | 11/740,265 | 11/737,720 | 11/739,056 | 11/740,204 | 11/740,223 | 11/753,557 |
| 11/750,285 | 11/758,648 | 11/778,559 | 11/834,634 | 11/838,878 | 11/845,669 | 6,799,853 |
| 7,237,896 | 6,749,301 | 10/451,722 | 7,137,678 | 7,252,379 | 7,144,107 | 10/503,900 |
| 10/503,898 | 10/503,897 | 7,220,068 | 7,270,410 | 7,241,005 | 7,108,437 | 7,140,792 |
| 10/503,922 | 7,224,274 | 10/503,917 | 10/503,918 | 10/503,925 | 10/503,927 | 10/503,928 |
| 10/503,929 | 10/503,885 | 7,195,325 | 7,229,164 | 7,150,523 | 10/503,889 | 7,154,580 |
| 6,906,778 | 7,167,158 | 7,128,269 | 6,688,528 | 6,986,613 | 6,641,315 | 7,278,702 |
| 10/503,891 | 7,150,524 | 7,155,395 | 6,915,140 | 6,999,206 | 6,795,651 | 6,883,910 |
| 7,118,481 | 7,136,198 | 7,092,130 | 6,786,661 | 6,808,325 | 10/920,368 | 10/920,284 |
| 7,219,990 | 10/920,283 | 6,750,901 | 6,476,863 | 6,788,336 | 6,322,181 | 6,597,817 |
| 6,227,648 | 6,727,948 | 6,690,419 | 10/470,947 | 6,619,654 | 6,969,145 | 6,679,582 |
| 10/470,942 | 6,568,670 | 6,866,373 | 7,280,247 | 7,008,044 | 6,742,871 | 6,966,628 |
| 6,644,781 | 6,969,143 | 6,767,076 | 6,834,933 | 6,692,113 | 6,913,344 | 6,727,951 |
| 7,128,395 | 7,036,911 | 7,032,995 | 6,969,151 | 6,955,424 | 6,969,162 | 10/919,249 |
| 6,942,315 | 11/006,577 | 7,234,797 | 6,986,563 | 7,295,211 | 11/045,442 | 7,286,162 |
| 7,283,159 | 7,077,330 | 6,196,541 | 11/149,389 | 11/185,725 | 7,226,144 | 11/202,344 |
| 7,267,428 | 11/248,423 | 11/248,422 | 7,093,929 | 11/282,769 | 11/330,060 | 11/442,111 |
| 7,290,862 | 11/499,806 | 11/499,710 | 6,195,150 | 11/749,156 | 11/782,588 | 11/854,435 |
| 11/853,817 | 11/935,958 | 11/924,608 | 6,362,868 | 11/970,993 | 6,831,681 | 6,431,669 |
| 6,362,869 | 6,472,052 | 6,356,715 | 6,894,694 | 6,636,216 | 6,366,693 | 6,329,990 |
| 6,459,495 | 6,137,500 | 6,690,416 | 7,050,143 | 6,398,328 | 7,110,024 | 6,431,704 |
| 6,879,341 | 6,415,054 | 6,665,454 | 6,542,645 | 6,486,886 | 6,381,361 | 6,317,192 |
| 6,850,274 | 09/113,054 | 6,646,757 | 6,624,848 | 6,357,135 | 6,271,931 | 6,353,772 |
| 6,106,147 | 6,665,008 | 6,304,291 | 6,305,770 | 6,289,262 | 6,315,200 | 6,217,165 |
| 6,496,654 | 6,859,225 | 6,924,835 | 6,647,369 | 6,943,830 | 09/693,317 | 7,021,745 |
| 6,712,453 | 6,460,971 | 6,428,147 | 6,416,170 | 6,402,300 | 6,464,340 | 6,612,687 |
| 6,412,912 | 6,447,099 | 6,837,567 | 6,505,913 | 7,128,845 | 6,733,684 | 7,249,108 |
| 6,566,858 | 6,331,946 | 6,246,970 | 6,442,525 | 09/517,384 | 09/505,951 | 6,374,354 |
| 7,246,098 | 6,816,968 | 6,757,832 | 6,334,190 | 6,745,331 | 7,249,109 | 10/203,559 |
| 7,197,642 | 7,093,139 | 10/636,263 | 10/636,283 | 10/866,608 | 7,210,038 | 10/902,883 |
| 10/940,653 | 10/942,858 | 11/706,329 | 11/757,385 | 11/758,642 | 7,119,836 | 7,283,162 |
| 7,286,169 | 10/636,285 | 7,170,652 | 6,967,750 | 6,995,876 | 7,099,051 | 7,172,191 |
| 7,243,916 | 7,222,845 | 11/239,232 | 7,285,227 | 7,063,940 | 11/107,942 | 7,193,734 |
| 7,086,724 | 7,090,337 | 7,278,723 | 7,140,717 | 11/190,902 | 11/209,711 | 7,256,824 |
| 7,140,726 | 7,156,512 | 7,186,499 | 11/478,585 | 11/525,862 | 11/540,574 | 11/583,875 |
| 11/592,181 | 6,750,944 | 11/599,336 | 7,291,447 | 11/744,183 | 11/758,646 | 11/778,561 |
| 11/839,532 | 11/838,874 | 11/853,021 | 11/869,710 | 11/868,531 | 11/927,403 | 11/951,960 |
| 10/636,225 | 6,985,207 | 6,773,874 | 6,650,836 | 10/666,495 | 10/636,224 | 7,250,975 |
| 7,295,343 | 6,880,929 | 7,236,188 | 7,236,187 | 7,155,394 | 10/636,219 | 10/636,223 |
| 7,055,927 | 6,986,562 | 7,052,103 | 7,312,845 | 10/656,281 | 10/656,791 | 10/666,124 |
| 10/683,217 | 7,289,142 | 7,095,533 | 6,914,686 | 6,896,252 | 6,820,871 | 6,834,851 |
| 6,848,686 | 6,830,246 | 6,851,671 | 10/729,098 | 7,092,011 | 7,187,404 | 10/729,159 |
| 10/753,458 | 6,878,299 | 6,929,348 | 6,921,154 | 10/780,625 | 10/804,042 | 6,913,346 |
| 10/831,238 | 10/831,237 | 10/831,239 | 10/831,240 | 10/831,241 | 10/831,234 | 10/831,233 |
| 7,246,897 | 7,077,515 | 10/831,235 | 10/853,336 | 10/853,117 | 10/853,659 | 10/853,681 |
| 6,913,875 | 7,021,758 | 7,033,017 | 7,161,709 | 7,099,033 | 7,147,294 | 7,156,494 |
| 11/012,024 | 11/011,925 | 7,032,998 | 7,044,585 | 7,296,867 | 6,994,424 | 11/006,787 |
| 7,258,435 | 7,097,263 | 7,001,012 | 7,004,568 | 7,040,738 | 7,188,933 | 7,027,080 |
| 7,025,446 | 6,991,321 | 7,131,715 | 7,261,392 | 7,207,647 | 7,182,435 | 7,097,285 |
| 11/228,410 | 7,097,284 | 7,083,264 | 7,147,304 | 7,232,203 | 7,156,498 | 7,201,471 |
| 11/501,772 | 11/503,084 | 11/513,073 | 7,210,764 | 11/635,524 | 11/706,379 | 11/730,386 |
| 11/730,784 | 11/753,568 | 11/782,591 | 11/859,783 | 6,710,457 | 6,775,906 | 6,507,099 |
| 7,221,043 | 7,107,674 | 7,154,172 | 11/442,400 | 7,247,941 | 11/736,540 | 11/758,644 |
| 11/940,304 | 6,530,339 | 6,631,897 | 6,851,667 | 6,830,243 | 6,860,479 | 6,997,452 |

-continued

| | | | | | | |
|---|---|---|---|---|---|---|
| 7,000,913 | 7,204,482 | 11/212,759 | 11/281,679 | 11/730,409 | 6,238,044 | 6,425,661 |
| 11/003,786 | 7,258,417 | 7,293,853 | 11/003,334 | 7,270,395 | 11/003,404 | 11/003,419 |
| 11/003,700 | 7,255,419 | 7,284,819 | 7,229,148 | 7,258,416 | 7,273,263 | 7,270,393 |
| 6,984,017 | 11/003,699 | 11/071,473 | 7,156,497 | 11/601,670 | 11/748,482 | 11/778,563 |
| 11/779,851 | 11/778,574 | 11/853,816 | 11/853,814 | 11/853,786 | 11/872,037 | 11/856,694 |
| 11/965,703 | 11/003,463 | 11/003,701 | 11/003,683 | 11/003,614 | 7,284,820 | 11/003,684 |
| 7,246,875 | 11/003,617 | 11/764,760 | 11/853,777 | 11/955,354 | 11/293,800 | 11/293,802 |
| 11/293,801 | 11/293,808 | 11/293,809 | 11/482,975 | 11/482,970 | 11/482,968 | 11/482,972 |
| 11/482,971 | 11/482,969 | 6,431,777 | 6,334,664 | 6,447,113 | 7,239,407 | 6,398,359 |
| 6,652,089 | 6,652,090 | 7,057,759 | 6,631,986 | 7,187,470 | 7,280,235 | 11/501,775 |
| 11/744,210 | 11/859,784 | 6,471,331 | 6,676,250 | 6,347,864 | 6,439,704 | 6,425,700 |
| 6,588,952 | 6,626,515 | 6,722,758 | 6,871,937 | 11/060,803 | 11/097,266 | 11/097,267 |
| 11/685,084 | 11/685,086 | 11/685,090 | 11/740,925 | 11/763,444 | 11/763,443 | 11/946,840 |
| 11/961,712 | 7,249,942 | 7,206,654 | 7,162,324 | 7,162,325 | 7,231,275 | 7,146,236 |
| 7,278,847 | 10/753,499 | 6,997,698 | 7,220,112 | 7,231,276 | 10/753,440 | 7,220,115 |
| 7,195,475 | 7,144,242 | 11/499,746 | 11/501,774 | 11/525,858 | 11/545,501 | 11/599,335 |
| 11/706,380 | 11/736,545 | 11/736,554 | 11/739,047 | 11/749,159 | 11/739,073 | 11/775,160 |
| 11/853,755 | 11/940,291 | 11/934,071 | 11/951,913 | 6,786,420 | 6,827,282 | 6,948,661 |
| 7,073,713 | 10/983,060 | 7,093,762 | 7,083,108 | 7,222,799 | 7,201,319 | 11/442,103 |
| 11/739,071 | 11/518,238 | 11/518,280 | 11/518,244 | 11/518,243 | 11/518,242 | 7,032,899 |
| 6,854,724 | 11/084,237 | 11/084,240 | 11/084,238 | 11/357,296 | 11/357,298 | 11/357,297 |
| 6,350,023 | 6,318,849 | 6,592,207 | 6,439,699 | 6,312,114 | 11/246,676 | 11/246,677 |
| 11/246,678 | 11/246,679 | 11/246,680 | 11/246,681 | 11/246,714 | 11/246,713 | 11/246,689 |
| 11/246,671 | 11/246,670 | 11/246,669 | 11/246,704 | 11/246,710 | 11/246,688 | 11/246,716 |
| 11/246,715 | 11/246,707 | 11/246,706 | 11/246,705 | 11/246,708 | 11/246,693 | 11/246,692 |
| 11/246,696 | 11/246,695 | 11/246,694 | 11/482,958 | 11/482,955 | 11/482,962 | 11/482,963 |
| 11/482,956 | 11/482,954 | 11/482,974 | 11/482,957 | 11/482,987 | 11/482,959 | 11/482,960 |
| 11/482,961 | 11/482,964 | 11/482,965 | 11/482,976 | 11/482,973 | 11/495,815 | 11/495,816 |
| 11/495,817 | 60,992,635 | 60,992,637 | 60,992,641 | 10/803,074 | 10/803,073 | 7,040,823 |
| 10/803,076 | 10/803,077 | 10/803,078 | 10/803,079 | 10/922,971 | 10/922,970 | 10/922,836 |
| 10/922,842 | 10/922,848 | 10/922,843 | 7,125,185 | 7,229,226 | 11/513,386 | 11/753,559 |
| 10/815,621 | 7,243,835 | 10/815,630 | 10/815,637 | 10/815,638 | 7,251,050 | 10/815,642 |
| 7,097,094 | 7,137,549 | 10/815,618 | 7,156,292 | 11/738,974 | 10/815,635 | 10/815,647 |
| 10/815,634 | 7,137,566 | 7,131,596 | 7,128,265 | 7,207,485 | 7,197,374 | 7,175,089 |
| 10/815,617 | 10/815,620 | 7,178,719 | 10/815,613 | 7,207,483 | 7,296,737 | 7,270,266 |
| 10/815,614 | 11/446,240 | 11/488,162 | 11/488,163 | 11/488,164 | 11/488,167 | 11/488,168 |
| 11/488,165 | 11/488,166 | 7,267,273 | 11/834,628 | 11/839,497 | 11/944,449 | 10/815,636 |
| 7,128,270 | 11/041,650 | 11/041,651 | 11/041,652 | 11/041,649 | 11/041,610 | 11/863,253 |
| 11/863,255 | 11/863,257 | 11/863,258 | 11/863,262 | 11/041,609 | 11/041,626 | 11/041,627 |
| 11/041,624 | 11/041,625 | 11/863,268 | 11/863,269 | 11/863,270 | 11/863,271 | 11/863,273 |
| 76,584,733 | 11/041,556 | 11/041,580 | 11/041,723 | 11/041,698 | 11/041,648 | 11/863,263 |
| 11/863,264 | 11/863,265 | 11/863,266 | 11/863,267 | 10/815,609 | 7,150,398 | 7,159,777 |
| 10/815,610 | 7,188,769 | 7,097,106 | 7,070,110 | 7,243,849 | 11/442,381 | 11/480,957 |
| 11/764,694 | 11/957,470 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 | 6,247,794 |
| 6,234,610 | 6,247,793 | 6,264,306 | 6,241,342 | 6,247,792 | 6,264,307 | 6,254,220 |
| 6,234,611 | 6,302,528 | 6,283,582 | 6,239,821 | 6,338,547 | 6,247,796 | 6,557,977 |
| 6,390,603 | 6,362,843 | 6,293,653 | 6,312,107 | 6,227,653 | 6,234,609 | 6,238,040 |
| 6,188,415 | 6,227,654 | 6,209,989 | 6,247,791 | 6,336,710 | 6,217,153 | 6,416,167 |
| 6,243,113 | 6,283,581 | 6,247,790 | 6,260,953 | 6,267,469 | 6,588,882 | 6,742,873 |
| 6,918,655 | 6,547,371 | 6,938,989 | 6,598,964 | 6,923,526 | 6,273,544 | 6,309,048 |
| 6,420,196 | 6,443,558 | 6,439,689 | 6,378,989 | 6,848,181 | 6,634,735 | 6,299,289 |
| 6,299,290 | 6,425,654 | 6,902,255 | 6,623,101 | 6,406,129 | 6,505,916 | 6,457,809 |
| 6,550,895 | 6,457,812 | 7,152,962 | 6,428,133 | 7,216,956 | 7,080,895 | 11/144,844 |
| 7,182,437 | 11/599,341 | 11/635,533 | 11/607,976 | 11/607,975 | 11/607,999 | 11/607,980 |
| 11/607,979 | 11/607,978 | 11/735,961 | 11/685,074 | 11/696,126 | 11/696,144 | 11/696,650 |
| 11/763,446 | 6,224,780 | 6,235,212 | 6,280,643 | 6,284,147 | 6,214,244 | 6,071,750 |
| 6,267,905 | 6,251,298 | 6,258,285 | 6,225,138 | 6,241,904 | 6,299,786 | 6,866,789 |
| 6,231,773 | 6,190,931 | 6,248,249 | 6,290,862 | 6,241,906 | 6,565,762 | 6,241,905 |
| 6,451,216 | 6,231,772 | 6,274,056 | 6,290,861 | 6,248,248 | 6,306,671 | 6,331,258 |
| 6,110,754 | 6,294,101 | 6,416,679 | 6,264,849 | 6,254,793 | 6,245,246 | 6,855,264 |
| 6,235,211 | 6,491,833 | 6,264,850 | 6,258,284 | 6,312,615 | 6,228,668 | 6,180,427 |
| 6,171,875 | 6,267,904 | 6,245,247 | 6,315,914 | 7,169,316 | 6,526,658 | 7,210,767 |
| 11/056,146 | 11/635,523 | 6,665,094 | 6,450,605 | 6,512,596 | 6,654,144 | 7,125,090 |
| 6,687,022 | 7,072,076 | 7,092,125 | 7,215,443 | 7,136,195 | 7,077,494 | 6,877,834 |
| 6,969,139 | 10/636,227 | 7,283,280 | 6,912,067 | 7,277,205 | 7,154,637 | 10/636,230 |
| 7,070,251 | 6,851,782 | 10/636,211 | 10/636,247 | 6,843,545 | 7,079,286 | 7,064,867 |
| 7,065,247 | 7,027,177 | 7,218,415 | 7,064,873 | 6,954,276 | 7,061,644 | 7,092,127 |
| 7,059,695 | 10/990,382 | 7,177,052 | 7,270,394 | 11/124,231 | 7,188,921 | 7,187,469 |
| 7,196,820 | 11/281,445 | 7,283,281 | 7,251,051 | 7,245,399 | 11/524,911 | 11/640,267 |
| 11/706,297 | 11/730,387 | 11/737,142 | 11/764,729 | 11/834,637 | 11/853,019 | 11/863,239 |
| 11/305,274 | 11/305,273 | 11/305,275 | 11/305,152 | 11/305,158 | 11/305,008 | 6,231,148 |
| 6,293,658 | 6,614,560 | 6,238,033 | 6,312,070 | 6,238,111 | 6,378,970 | 6,196,739 |
| 6,270,182 | 6,152,619 | 7,006,143 | 6,876,394 | 6,738,096 | 6,970,186 | 6,287,028 |
| 6,412,993 | 11/033,145 | 11/102,845 | 11/102,861 | 11/248,421 | 11/672,878 | 7,204,941 |
| 7,282,164 | 10/815,628 | 11/845,672 | 7,278,727 | 10/913,373 | 10/913,374 | 10/913,372 |
| 7,138,391 | 7,153,956 | 10/913,380 | 10/913,379 | 10/913,376 | 7,122,076 | 7,148,345 |
| 11/172,816 | 11/172,815 | 11/172,814 | 11/482,990 | 11/482,986 | 11/482,985 | 11/454,899 |
| 11/583,942 | 11/592,990 | 11/849,360 | 11/831,961 | 11/831,962 | 11/831,963 | 60,951,700 |
| 11/832,629 | 11/832,637 | 60,971,535 | 10/407,212 | 7,252,366 | 10/683,064 | 10/683,041 |

-continued

| | | | | | | |
|---|---|---|---|---|---|---|
| 7,275,811 | 10/884,889 | 10/922,890 | 10/922,875 | 10/922,885 | 10/922,889 | 10/922,884 |
| 10/922,879 | 10/922,887 | 10/922,888 | 10/922,874 | 7,234,795 | 10/922,871 | 10/922,880 |
| 7,293,855 | 10/922,882 | 10/922,883 | 10/922,878 | 10/922,872 | 10/922,876 | 10/922,886 |
| 10/922,877 | 7,147,792 | 7,175,774 | 11/159,193 | 11/491,378 | 11/766,713 | 11/841,647 |
| 11/482,980 | 11/563,684 | 11/482,967 | 11/482,966 | 11/482,988 | 11/482,989 | 11/293,832 |
| 11/293,838 | 11/293,825 | 11/293,841 | 11/293,799 | 11/293,796 | 11/293,797 | 11/293,798 |
| 11/124,158 | 11/124,196 | 11/124,199 | 11/124,162 | 11/124,202 | 11/124,197 | 11/124,154 |
| 11/124,198 | 7,284,921 | 11/124,151 | 11/124,160 | 11/124,192 | 11/124,175 | 11/124,163 |
| 11/124,149 | 11/124,152 | 11/124,173 | 11/124,155 | 7,236,271 | 11/124,174 | 11/124,194 |
| 11/124,164 | 11/124,200 | 11/124,195 | 11/124,166 | 11/124,150 | 11/124,172 | 11/124,165 |
| 11/124,186 | 11/124,185 | 11/124,184 | 11/124,182 | 11/124,201 | 11/124,171 | 11/124,181 |
| 11/124,161 | 11/124,156 | 11/124,191 | 11/124,159 | 11/124,176 | 11/124,188 | 11/124,170 |
| 11/124,187 | 11/124,189 | 11/124,190 | 11/124,180 | 11/124,193 | 11/124,183 | 11/124,178 |
| 11/124,177 | 11/124,148 | 11/124,168 | 11/124,167 | 11/124,179 | 11/124,169 | 11/187,976 |
| 11/188,011 | 11/188,014 | 11/482,979 | 11/735,490 | 11/853,018 | 11/944,450 | 11/228,540 |
| 11/228,500 | 11/228,501 | 11/228,530 | 11/228,490 | 11/228,531 | 11/228,504 | 11/228,533 |
| 11/228,502 | 11/228,507 | 11/228,482 | 11/228,505 | 11/228,497 | 11/228,487 | 11/228,529 |
| 11/228,484 | 11/228,489 | 11/228,518 | 11/228,536 | 11/228,496 | 11/228,488 | 11/228,506 |
| 11/228,516 | 11/228,526 | 11/228,539 | 11/228,538 | 11/228,524 | 11/228,523 | 11/228,519 |
| 11/228,528 | 11/228,527 | 11/228,525 | 11/228,520 | 11/228,498 | 11/228,511 | 11/228,522 |
| 11/228,515 | 11/228,537 | 11/228,534 | 11/228,491 | 11/228,499 | 11/228,509 | 11/228,492 |
| 11/228,493 | 11/228,510 | 11/228,508 | 11/228,512 | 11/228,514 | 11/228,494 | 11/228,495 |
| 11/228,486 | 11/228,481 | 11/228,477 | 11/228,485 | 11/228,483 | 11/228,521 | 11/228,517 |
| 11/228,532 | 11/228,513 | 11/228,503 | 11/228,480 | 11/228,535 | 11/228,478 | 11/228,479 |
| 6,238,115 | 6,386,535 | 6,398,344 | 6,612,240 | 6,752,549 | 6,805,049 | 6,971,313 |
| 6,899,480 | 6,860,664 | 6,925,935 | 6,966,636 | 7,024,995 | 7,284,852 | 6,926,455 |
| 7,056,038 | 6,869,172 | 7,021,843 | 6,988,845 | 6,964,533 | 6,981,809 | 7,284,822 |
| 7,258,067 | 11/155,544 | 7,222,941 | 7,284,925 | 7,278,795 | 7,249,904 | 11/737,726 |
| 11/772,240 | 11/863,246 | 11/863,145 | 11/865,650 | 6,087,638 | 6,340,222 | 6,041,600 |
| 6,299,300 | 6,067,797 | 6,286,935 | 6,044,646 | 6,382,769 | 6,787,051 | 6,938,990 |
| 11/242,916 | 11/144,799 | 11/198,235 | 11/861,282 | 11/861,284 | 11/766,052 | 7,152,972 |
| 11/592,996 | D529952 | 6,390,605 | 6,322,195 | 6,612,110 | 6,480,089 | 6,460,778 |
| 6,305,788 | 6,426,014 | 6,364,453 | 6,457,795 | 6,315,399 | 6,338,548 | 7,040,736 |
| 6,938,992 | 6,994,425 | 6,863,379 | 6,540,319 | 6,994,421 | 6,984,019 | 7,008,043 |
| 6,997,544 | 6,328,431 | 6,991,310 | 10/965,772 | 7,140,723 | 6,328,425 | 6,982,184 |
| 7,267,423 | 7,134,741 | 7,066,577 | 7,152,945 | 11/038,200 | 7,021,744 | 6,991,320 |
| 7,155,911 | 11/107,799 | 6,595,624 | 7,152,943 | 7,125,103 | 11/209,709 | 7,290,857 |
| 7,285,437 | 7,229,151 | 11/330,058 | 7,237,873 | 11/329,163 | 11/442,180 | 11/450,431 |
| 7,213,907 | 6,417,757 | 11/482,951 | 11/545,566 | 11/583,826 | 11/604,315 | 11/604,323 |
| 11/643,845 | 11/706,950 | 11/730,399 | 11/749,121 | 11/753,549 | 11/834,630 | 11/935,389 |
| 11/869,670 | 7,095,309 | 11/945,157 | 11/957,473 | 11/967,235 | 6,854,825 | 6,623,106 |
| 6,672,707 | 6,575,561 | 6,817,700 | 6,588,885 | 7,075,677 | 6,428,139 | 6,575,549 |
| 6,846,692 | 6,425,971 | 7,063,993 | 6,383,833 | 6,955,414 | 6,412,908 | 6,746,105 |
| 6,953,236 | 6,412,904 | 7,128,388 | 6,398,343 | 6,652,071 | 6,793,323 | 6,659,590 |
| 6,676,245 | 7,201,460 | 6,464,332 | 6,659,593 | 6,478,406 | 6,978,613 | 6,439,693 |
| 6,502,306 | 6,966,111 | 6,863,369 | 6,428,142 | 6,874,868 | 6,390,591 | 6,799,828 |
| 6,896,358 | 7,018,016 | 10/296,534 | 6,328,417 | 6,322,194 | 6,382,779 | 6,629,745 |
| 6,565,193 | 6,609,786 | 6,609,787 | 6,439,908 | 6,684,503 | 6,843,551 | 6,764,166 |
| 6,561,617 | 10/510,092 | 6,557,970 | 6,546,628 | 10/510,098 | 6,652,074 | 6,820,968 |
| 7,175,260 | 6,682,174 | 7,303,262 | 6,648,453 | 6,834,932 | 6,682,176 | 6,998,062 |
| 6,767,077 | 7,278,717 | 6,755,509 | 10/534,813 | 6,692,108 | 10/534,811 | 6,672,709 |
| 7,303,263 | 7,086,718 | 10/534,881 | 6,672,710 | 10/534,812 | 6,669,334 | 10/534,804 |
| 7,152,958 | 7,281,782 | 6,824,246 | 7,264,336 | 6,669,333 | 10/534,815 | 6,820,967 |
| 7,306,326 | 6,736,489 | 7,264,335 | 6,719,406 | 7,222,943 | 7,188,419 | 7,168,166 |
| 6,974,209 | 7,086,719 | 6,974,210 | 7,195,338 | 7,252,775 | 7,101,025 | 11/474,281 |
| 11/485,258 | 11/706,304 | 11/706,324 | 11/706,326 | 11/706,321 | 11/772,239 | 11/782,598 |
| 11/829,941 | 11/852,991 | 11/852,986 | 11/936,062 | 11/934,027 | 11/955,028 | 11/763,440 |
| 11/763,442 | 11/246,687 | 11/246,718 | 11/246,685 | 11/246,686 | 11/246,703 | 11/246,691 |
| 11/246,711 | 11/246,690 | 11/246,712 | 11/246,717 | 11/246,709 | 11/246,700 | 11/246,701 |
| 11/246,702 | 11/246,668 | 11/246,697 | 11/246,698 | 11/246,699 | 11/246,675 | 11/246,674 |
| 11/246,667 | 11/829,957 | 11/829,960 | 11/829,961 | 11/829,962 | 11/829,963 | 11/829,966 |
| 11/829,967 | 11/829,968 | 11/829,969 | 11/946,839 | 11/946,838 | 11/946,837 | 11/951,230 |
| 7,156,508 | 7,159,972 | 7,083,271 | 7,165,834 | 7,080,894 | 7,201,469 | 7,090,336 |
| 7,156,489 | 10/760,233 | 10/760,246 | 7,083,257 | 7,258,422 | 7,255,423 | 7,219,980 |
| 10/760,253 | 10/760,255 | 10/760,209 | 7,118,192 | 10/760,194 | 10/760,238 | 7,077,505 |
| 7,198,354 | 7,077,504 | 10/760,189 | 7,198,355 | 10/760,232 | 10/760,231 | 7,152,959 |
| 7,213,906 | 7,178,901 | 7,222,938 | 7,108,353 | 7,104,629 | 11/446,227 | 11/454,904 |
| 11/472,345 | 11/474,273 | 7,261,401 | 11/474,279 | 11/482,939 | 11/482,950 | 11/499,709 |
| 7,306,324 | 7,306,325 | 11/603,824 | 11/601,756 | 11/601,672 | 7,303,261 | 11/653,253 |
| 11/706,328 | 11/706,299 | 11/706,965 | 11/737,080 | 11/737,041 | 11/778,062 | 11/778,566 |
| 11/782,593 | 11/934,018 | 11/945,157 | 11/951,095 | 11/951,828 | 11/954,906 | 11/954,949 |
| 11/967,226 | 7,303,930 | 11/246,672 | 11/246,673 | 11/246,683 | 11/246,682 | 60/939,086 |
| 11/860,538 | 11/860,539 | 11/860,540 | 11/860,541 | 11/860,542 | 11/936,060 | 11/877,667 |
| 11/877,668 | 7,246,886 | 7,128,400 | 7,108,355 | 6,991,322 | 7,287,836 | 7,118,197 |
| 10/728,784 | 10/728,783 | 7,077,493 | 6,962,402 | 10/728,803 | 7,147,308 | 10/728,779 |
| 7,118,198 | 7,168,790 | 7,172,270 | 7,229,155 | 6,830,318 | 7,195,342 | 7,175,261 |
| 10/773,183 | 7,108,356 | 7,118,202 | 10/773,186 | 7,134,744 | 10/773,185 | 7,134,743 |
| 7,182,439 | 7,210,768 | 10/773,187 | 7,134,745 | 7,156,484 | 7,118,201 | 7,111,926 |
| 10/773,184 | 7,018,021 | 11/060,751 | 11/060,805 | 11/188,017 | 7,128,402 | 11/298,774 |
| 11/329,157 | 11/490,041 | 11/501,767 | 7,284,839 | 7,246,885 | 7,229,156 | 11/505,846 |

-continued

| | | | | | | |
|---|---|---|---|---|---|---|
| 11/505,857 | 7,293,858 | 11/524,908 | 11/524,938 | 7,258,427 | 11/524,912 | 7,278,716 |
| 11/592,995 | 11/603,825 | 11/649,773 | 11/650,549 | 11/653,237 | 11/706,378 | 11/706,962 |
| 11/749,118 | 11/754,937 | 11/749,120 | 11/744,885 | 11/779,850 | 11/765,439 | 11/842,950 |
| 11/839,539 | 11/926,121 | 11/097,308 | 11/097,309 | 7,246,876 | 11/097,299 | 11/097,310 |
| 11/097,213 | 11/210,687 | 11/097,212 | 7,147,306 | 7,261,394 | 11/764,806 | 11/782,595 |
| 11/965,696 | 11/482,953 | 11/482,977 | 11/544,778 | 11/544,779 | 11/764,808 | 11/756,624 |
| 11/756,625 | 11/756,626 | 11/756,627 | 11/756,628 | 11/756,629 | 11/756,630 | 11/756,631 |
| 7,156,289 | 7,178,718 | 7,225,979 | 11/712,434 | 11/084,796 | 11/084,742 | 11/084,806 |
| 09/575,197 | 7,079,712 | 6,825,945 | 09/575,165 | 6,813,039 | 7,190,474 | 6,987,506 |
| 6,824,044 | 7,038,797 | 6,980,318 | 6,816,274 | 7,102,772 | 09/575,186 | 6,681,045 |
| 6,678,499 | 6,679,420 | 6,963,845 | 6,976,220 | 6,728,000 | 7,110,126 | 7,173,722 |
| 6,976,035 | 6,813,558 | 6,766,942 | 6,965,454 | 6,995,859 | 7,088,459 | 6,720,985 |
| 7,286,113 | 6,922,779 | 6,978,019 | 6,847,883 | 7,131,058 | 7,295,839 | 09/607,843 |
| 09/693,690 | 6,959,298 | 6,973,450 | 7,150,404 | 6,965,882 | 7,233,924 | 09/575,181 |
| 09/722,174 | 7,175,079 | 7,162,259 | 6,718,061 | 10/291,523 | 10/291,471 | 7,012,710 |
| 6,825,956 | 10/291,481 | 7,222,098 | 10/291,825 | 7,263,508 | 7,031,010 | 6,972,864 |
| 6,862,105 | 7,009,738 | 6,989,911 | 6,982,807 | 10/291,576 | 6,829,387 | 6,714,678 |
| 6,644,545 | 6,609,653 | 6,651,879 | 10/291,555 | 7,293,240 | 10/291,592 | 10/291,542 |
| 7,044,363 | 7,004,390 | 6,867,880 | 7,034,953 | 6,987,581 | 7,216,224 | 10/291,821 |
| 7,162,269 | 7,162,222 | 7,290,210 | 7,293,233 | 7,293,234 | 6,850,931 | 6,865,570 |
| 6,847,961 | 10/685,523 | 10/685,583 | 7,162,442 | 10/685,584 | 7,159,784 | 10/804,034 |
| 10/793,933 | 6,889,896 | 10/831,232 | 7,174,056 | 6,996,274 | 7,162,088 | 10/943,874 |
| 10/943,872 | 10/944,044 | 7,259,884 | 10/944,043 | 7,167,270 | 10/943,877 | 6,986,459 |
| 10/954,170 | 7,181,448 | 10/981,626 | 10/981,616 | 10/981,627 | 7,231,293 | 7,174,329 |
| 10/992,713 | 7,295,922 | 7,200,591 | 11/020,106 | 11/020,260 | 11/020,321 | 11/020,319 |
| 11/026,045 | 11/059,696 | 11/051,032 | 11/059,674 | 11/107,944 | 11/107,941 | 11/082,940 |
| 11/082,815 | 11/082,827 | 11/082,829 | 6,991,153 | 6,991,154 | 11/124,256 | 11/123,136 |
| 11/154,676 | 11/159,196 | 11/182,002 | 11/202,251 | 11/202,252 | 11/202,253 | 11/203,200 |
| 11/202,218 | 11/206,778 | 11/203,424 | 11/222,977 | 11/228,450 | 11/227,239 | 11/286,334 |
| 7,225,402 | 11/329,187 | 11/349,143 | 11/491,225 | 11/491,121 | 11/442,428 | 11/454,902 |
| 11/442,385 | 11/478,590 | 7,271,931 | 11/520,170 | 11/603,057 | 11/706,964 | 11/739,032 |
| 11/739,014 | 11/834,633 | 11/830,848 | 11/830,849 | 11/839,542 | 11/866,394 | 11/934,077 |
| 11/951,874 | 7,068,382 | 7,007,851 | 6,957,921 | 6,457,883 | 10/743,671 | 7,044,381 |
| 11/203,205 | 7,094,910 | 7,091,344 | 7,122,685 | 7,038,066 | 7,099,019 | 7,062,651 |
| 6,789,194 | 6,789,191 | 10/900,129 | 7,278,018 | 10/913,350 | 10/982,975 | 10/983,029 |
| 11/331,109 | 6,644,642 | 6,502,614 | 6,622,999 | 6,669,385 | 6,827,116 | 7,011,128 |
| 10/949,307 | 6,549,935 | 6,987,573 | 6,727,996 | 6,591,884 | 6,439,706 | 6,760,119 |
| 7,295,332 | 7,064,851 | 6,826,547 | 6,290,349 | 6,428,155 | 6,785,016 | 6,831,682 |
| 6,741,871 | 6,927,871 | 6,980,306 | 6,965,439 | 6,840,606 | 7,036,918 | 6,977,746 |
| 6,970,264 | 7,068,389 | 7,093,991 | 7,190,491 | 10/901,154 | 10/932,044 | 10/962,412 |
| 7,177,054 | 10/962,552 | 10/965,733 | 10/965,933 | 10/974,742 | 10/982,974 | 7,180,609 |
| 10/986,375 | 11/107,817 | 7,292,363 | 11/149,160 | 11/206,756 | 11/250,465 | 7,202,959 |
| 11/653,219 | 11/706,309 | 11/730,389 | 11/730,392 | 60/953,443 | 11/866,387 | 60/974,077 |
| 6,982,798 | 6,870,966 | 6,822,639 | 6,474,888 | 6,627,870 | 6,724,374 | 6,788,982 |
| 7,263,270 | 6,788,293 | 6,946,672 | 6,737,591 | 7,091,960 | 09/693,514 | 6,792,165 |
| 7,105,753 | 6,795,593 | 6,980,704 | 6,768,821 | 7,132,612 | 7,041,916 | 6,797,895 |
| 7,015,901 | 7,289,882 | 7,148,644 | 10/778,056 | 10/778,058 | 10/778,060 | 10/778,059 |
| 10/778,063 | 10/778,062 | 10/778,061 | 10/778,057 | 7,096,199 | 7,286,887 | 10/917,467 |
| 10/917,466 | 10/917,465 | 7,218,978 | 7,245,294 | 7,277,085 | 7,187,370 | 10/917,436 |
| 10/943,856 | 10/919,379 | 7,019,319 | 10/943,878 | 10/943,849 | 7,043,096 | 7,148,499 |
| 11/144,840 | 11/155,556 | 11/155,557 | 11/193,481 | 11/193,435 | 11/193,482 | 11/193,479 |
| 11/255,941 | 11/281,671 | 11/298,474 | 7,245,760 | 11/488,832 | 11/495,814 | 11/495,823 |
| 11/495,822 | 11/495,821 | 11/495,820 | 11/653,242 | 11/754,370 | 60/911,260 | 11/829,936 |
| 11/839,494 | 11/866,305 | 11/866,313 | 11/866,324 | 11/866,336 | 11/866,348 | 11/866,359 |
| 11/970,951 | 7,055,739 | 7,233,320 | 6,830,196 | 6,832,717 | 7,182,247 | 7,120,853 |
| 7,082,562 | 6,843,420 | 10/291,718 | 6,789,731 | 7,057,608 | 6,766,944 | 6,766,945 |
| 7,289,103 | 10/291,559 | 7,299,969 | 7,264,173 | 10/409,864 | 7,108,192 | 10/537,159 |
| 7,111,791 | 7,077,333 | 6,983,878 | 10/786,631 | 7,134,598 | 10/893,372 | 6,929,186 |
| 6,994,264 | 7,017,826 | 7,014,123 | 7,134,601 | 7,150,396 | 10/971,146 | 7,017,823 |
| 7,025,276 | 7,284,701 | 7,080,780 | 11/074,802 | 11/442,366 | 11/749,158 | 11/842,948 |
| 10/492,169 | 10/492,152 | 10/492,168 | 10/492,161 | 7,308,148 | 10/502,575 | 10/531,229 |
| 10/683,151 | 10/531,733 | 10/683,040 | 10/510,391 | 10/919,260 | 10/510,392 | 10/778,090 |
| 11/944,404 | 11/936,638 | 6,957,768 | 09/575,172 | 7,170,499 | 7,106,888 | 7,123,239 |
| 6,982,701 | 6,982,703 | 7,227,527 | 6,786,397 | 6,947,027 | 6,975,299 | 7,139,431 |
| 7,048,178 | 7,118,025 | 6,839,053 | 7,015,900 | 7,010,147 | 7,133,557 | 6,914,593 |
| 10/291,546 | 6,938,826 | 7,278,566 | 7,123,245 | 6,992,662 | 7,190,346 | 11/074,800 |
| 11/074,782 | 11/074,777 | 11/075,917 | 7,221,781 | 11/102,843 | 7,213,756 | 11/188,016 |
| 7,180,507 | 7,263,225 | 7,287,688 | 11/737,094 | 11/753,570 | 11/782,596 | 11/865,711 |
| 11/856,061 | 11/856,062 | 11/856,064 | 11/856,066 | 11/672,522 | 11/672,950 | 11/672,947 |
| 11/672,891 | 11/672,954 | 11/672,533 | 11/754,310 | 11/754,321 | 11/754,320 | 11/754,319 |
| 11/754,318 | 11/754,317 | 11/754,316 | 11/754,315 | 11/754,314 | 11/754,313 | 11/754,312 |
| 11/754,311 | 6,593,166 | 7,132,679 | 6,940,088 | 7,119,357 | 7,307,272 | 6,755,513 |
| 6,974,204 | 6,409,323 | 7,055,930 | 6,281,912 | 6,893,109 | 6,604,810 | 6,824,242 |
| 6,318,920 | 7,210,867 | 6,488,422 | 6,655,786 | 6,457,810 | 6,485,135 | 6,796,731 |
| 6,904,678 | 6,641,253 | 7,125,106 | 6,786,658 | 7,097,273 | 6,824,245 | 7,222,947 |
| 6,918,649 | 6,860,581 | 6,929,351 | 7,063,404 | 6,969,150 | 7,004,652 | 6,871,938 |
| 6,905,194 | 6,846,059 | 6,997,626 | 10/974,881 | 7,029,098 | 6,966,625 | 7,114,794 |
| 7,207,646 | 7,077,496 | 7,284,831 | 11/072,529 | 7,152,938 | 7,182,434 | 7,182,430 |
| 11/102,842 | 7,032,993 | 11/155,513 | 11/155,545 | 11/144,813 | 7,172,266 | 7,258,430 |
| 7,128,392 | 7,210,866 | 11/488,066 | 11/505,933 | 11/540,727 | 11/635,480 | 11/707,946 |

-continued

| | | | | | | |
|---|---|---|---|---|---|---|
| 11/706,303 | 11/709,084 | 11/730,776 | 11/744,143 | 11/779,845 | 11/782,589 | 11/863,256 |
| 11/940,302 | 11/940,235 | 11/955,359 | 11/066,161 | 11/066,160 | 11/066,159 | 11/066,158 |
| 7,287,831 | 11/875,936 | 6,804,030 | 6,807,315 | 6,771,811 | 6,683,996 | 7,271,936 |
| 7,304,771 | 6,965,691 | 7,058,219 | 7,289,681 | 7,187,807 | 7,181,063 | 11/338,783 |
| 11/603,823 | 11/650,536 | 10/727,181 | 10/727,162 | 10/727,163 | 10/727,245 | 7,121,639 |
| 7,165,824 | 7,152,942 | 10/727,157 | 7,181,572 | 7,096,137 | 7,302,592 | 7,278,034 |
| 7,188,282 | 10/727,159 | 10/727,180 | 10/727,179 | 10/727,192 | 10/727,274 | 10/727,164 |
| 10/727,161 | 10/727,198 | 10/727,158 | 10/754,536 | 10/754,938 | 10/727,227 | 10/727,160 |
| 10/934,720 | 7,171,323 | 7,278,697 | 11/442,131 | 11/474,278 | 11/488,853 | 11/488,841 |
| 11/749,750 | 11/749,749 | 11/955,127 | 11/951,213 | 10/296,522 | 6,795,215 | 7,070,098 |
| 7,154,638 | 6,805,419 | 6,859,289 | 6,977,751 | 6,398,332 | 6,394,573 | 6,622,923 |
| 6,747,760 | 6,921,144 | 10/884,881 | 7,092,112 | 7,192,106 | 11/039,866 | 7,173,739 |
| 6,986,560 | 7,008,033 | 11/148,237 | 7,222,780 | 7,270,391 | 7,150,510 | 11/478,599 |
| 11/499,749 | 11/521,388 | 11/738,518 | 11/482,981 | 11/743,662 | 11/743,661 | 11/743,659 |
| 11/743,655 | 11/743,657 | 11/752,900 | 11/926,109 | 11/927,163 | 11/929,567 | 7,195,328 |
| 7,182,422 | 11/650,537 | 11/712,540 | 10/854,521 | 10/854,522 | 10/854,488 | 7,281,330 |
| 10/854,503 | 10/854,504 | 10/854,509 | 7,188,928 | 7,093,989 | 10/854,497 | 10/854,495 |
| 10/854,498 | 10/854,511 | 10/854,512 | 10/854,525 | 10/854,526 | 10/854,516 | 7,252,353 |
| 10/854,515 | 7,267,417 | 10/854,505 | 10/854,493 | 7,275,805 | 7,314,261 | 10/854,490 |
| 7,281,777 | 7,290,852 | 10/854,528 | 10/854,523 | 10/854,527 | 10/854,524 | 10/854,520 |
| 10/854,514 | 10/854,519 | 10/854,513 | 10/854,499 | 10/854,501 | 7,266,661 | 7,243,193 |
| 10/854,518 | 10/854,517 | 10/934,628 | 7,163,345 | 11/499,803 | 11/601,757 | 11/706,295 |
| 11/735,881 | 11/748,483 | 11/749,123 | 11/766,061 | 11/775,135 | 11/772,235 | 11/778,569 |
| 11/829,942 | 11/870,342 | 11/935,274 | 11/937,239 | 11/961,907 | 11/961,940 | 11/961,961 |
| 11/014,731 | D529081 | D541848 | D528597 | 6,924,907 | 6,712,452 | 6,416,160 |
| 6,238,043 | 6,958,826 | 6,812,972 | 6,553,459 | 6,967,741 | 6,956,669 | 6,903,766 |
| 6,804,026 | 7,259,889 | 6,975,429 | 10/636,234 | 10/636,233 | 7,301,567 | 10/636,216 |
| 7,274,485 | 7,139,084 | 7,173,735 | 7,068,394 | 7,286,182 | 7,086,644 | 7,250,977 |
| 7,146,281 | 7,023,567 | 7,136,183 | 7,083,254 | 6,796,651 | 7,061,643 | 7,057,758 |
| 6,894,810 | 6,995,871 | 7,085,010 | 7,092,126 | 7,123,382 | 7,061,650 | 10/853,143 |
| 6,986,573 | 6,974,212 | 7,307,756 | 7,173,737 | 10/954,168 | 7,246,868 | 11/065,357 |
| 7,137,699 | 11/107,798 | 7,148,994 | 7,077,497 | 11/176,372 | 7,248,376 | 11/225,158 |
| 11/225,154 | 7,173,729 | 11/442,132 | 11/478,607 | 11/503,085 | 11/545,502 | 11/583,943 |
| 11/585,946 | 11/653,239 | 11/653,238 | 11/764,781 | 11/764,782 | 11/779,884 | 11/845,666 |
| 11/872,637 | 11/944,401 | 11/940,215 | 11/544,764 | 11/544,765 | 11/544,772 | 11/544,773 |
| 11/544,774 | 11/544,775 | 11/544,776 | 11/544,766 | 11/544,767 | 11/544,771 | 11/544,770 |
| 11/544,769 | 11/544,777 | 11/544,768 | 11/544,763 | 11/293,804 | 11/293,840 | 11/293,803 |
| 11/293,833 | 11/293,834 | 11/293,835 | 11/293,836 | 11/293,837 | 11/293,792 | 11/293,794 |
| 11/293,839 | 11/293,826 | 11/293,829 | 11/293,830 | 11/293,827 | 11/293,828 | 7,270,494 |
| 11/293,823 | 11/293,824 | 11/293,831 | 11/293,815 | 11/293,819 | 11/293,818 | 11/293,817 |
| 11/293,816 | 11/838,875 | 11/482,978 | 11/640,356 | 11/640,357 | 11/640,358 | 11/640,359 |
| 11/640,360 | 11/640,355 | 11/679,786 | 11/872,714 | 10/760,254 | 10/760,210 | 10/760,202 |
| 7,201,468 | 10/760,198 | 10/760,249 | 7,234,802 | 7,303,255 | 7,287,846 | 7,156,511 |
| 10/760,264 | 7,258,432 | 7,097,291 | 10/760,222 | 10/760,248 | 7,083,273 | 10/760,192 |
| 10/760,203 | 10/760,204 | 10/760,205 | 10/760,206 | 10/760,267 | 10/760,270 | 7,198,352 |
| 10/760,271 | 7,303,251 | 7,201,470 | 7,121,655 | 7,293,861 | 7,232,208 | 10/760,186 |
| 10/760,261 | 7,083,272 | 7,261,400 | 11/474,272 | 11/474,315 | 7,311,387 | 11/583,874 |
| 7,303,258 | 11/706,322 | 11/706,968 | 11/749,119 | 11/749,157 | 11/779,848 | 11/782,590 |
| 11/855,152 | 11/855,151 | 11/870,327 | 11/934,780 | 11/935,992 | 11/951,193 | 11/014,764 |
| 11/014,763 | 11/014,748 | 11/014,747 | 11/014,761 | 11/014,760 | 11/014,757 | 7,303,252 |
| 7,249,822 | 11/014,762 | 11/014,724 | 11/014,723 | 11/014,756 | 11/014,736 | 11/014,759 |
| 11/014,758 | 11/014,725 | 11/014,739 | 11/014,738 | 11/014,737 | 11/014,726 | 11/014,745 |
| 11/014,712 | 7,270,405 | 7,303,268 | 11/014,735 | 11/014,734 | 11/014,719 | 11/014,750 |
| 11/014,749 | 7,249,833 | 11/758,640 | 11/775,143 | 11/838,877 | 11/944,453 | 11/944,633 |
| 11/955,065 | 11/014,769 | 11/014,729 | 11/014,743 | 11/014,733 | 7,300,140 | 11/014,755 |
| 11/014,765 | 11/014,766 | 11/014,740 | 7,284,816 | 7,284,845 | 7,255,430 | 11/014,744 |
| 11/014,741 | 11/014,768 | 11/014,767 | 11/014,718 | 11/014,717 | 11/014,716 | 11/014,732 |
| 11/014,742 | 11/097,268 | 11/097,185 | 11/097,184 | 11/778,567 | 11/852,958 | 11/852,907 |
| 11/872,038 | 11/955,093 | 11/961,578 | 11/293,820 | 11/293,813 | 11/293,822 | 11/293,812 |
| 11/293,821 | 11/293,814 | 11/293,793 | 11/293,842 | 11/293,811 | 11/293,807 | 11/293,806 |
| 11/293,805 | 11/293,810 | 11/688,863 | 11/688,864 | 11/688,865 | 11/688,866 | 11/688,867 |
| 11/688,868 | 11/688,869 | 11/688,871 | 11/688,872 | 11/688,873 | 11/741,766 | 11/482,982 |
| 11/482,983 | 11/482,984 | 11/495,818 | 11/495,819 | 11/677,049 | 11/677,050 | 11/677,051 |
| 11/872,719 | 11/872,718 | 11/014,722 | 11/934,781 | D528156 | 10/760,180 | 7,111,935 |
| 10/760,213 | 10/760,219 | 10/760,237 | 7,261,482 | 10/760,220 | 7,002,664 | 10/760,252 |
| 10/760,265 | 7,088,420 | 11/446,233 | 11/503,083 | 11/503,081 | 11/516,487 | 11/599,312 |
| 6,364,451 | 6,533,390 | 6,454,378 | 7,224,478 | 6,559,969 | 6,896,362 | 7,057,760 |
| 6,982,799 | 11/202,107 | 11/743,672 | 11/744,126 | 11/743,673 | 7,093,494 | 7,143,652 |
| 7,089,797 | 7,159,467 | 7,234,357 | 7,124,643 | 7,121,145 | 7,089,790 | 7,194,901 |
| 6,968,744 | 7,089,798 | 7,240,560 | 7,137,302 | 11/442,177 | 7,171,855 | 7,260,995 |
| 7,260,993 | 7,165,460 | 7,222,538 | 7,258,019 | 11/543,047 | 7,258,020 | 11/604,324 |
| 11/642,520 | 11/706,305 | 11/707,056 | 11/744,211 | 11/767,526 | 11/779,846 | 11/764,227 |
| 11/829,943 | 11/829,944 | 6,454,482 | 6,808,330 | 6,527,365 | 6,474,773 | 6,550,997 |
| 7,093,923 | 6,957,923 | 7,131,724 | 10/949,288 | 7,168,867 | 7,125,098 | 11/706,966 |
| 11/185,722 | 7,249,901 | 7,188,930 | 11/014,728 | 11/014,727 | D536031 | D531214 |
| 7,237,888 | 7,168,654 | 7,201,272 | 6,991,098 | 7,217,051 | 6,944,970 | 10/760,215 |
| 7,108,434 | 10/760,257 | 7,210,407 | 7,186,042 | 10/760,266 | 6,920,704 | 7,217,049 |
| 10/760,214 | 10/760,260 | 7,147,102 | 7,287,828 | 7,249,838 | 10/760,241 | 10/962,413 |
| 10/962,427 | 7,261,477 | 7,225,739 | 10/962,402 | 10/962,425 | 10/962,428 | 7,191,978 |
| 10/962,426 | 10/962,409 | 10/962,417 | 10/962,403 | 7,163,287 | 7,258,415 | 10/962,523 |

-continued

| | | | | | | |
|---|---|---|---|---|---|---|
| 7,258,424 | 10/962,410 | 7,195,412 | 7,207,670 | 7,270,401 | 7,220,072 | 11/474,267 |
| 11/544,547 | 11/585,925 | 11/593,000 | 11/706,298 | 11/706,296 | 11/706,327 | 11/730,760 |
| 11/730,407 | 11/730,787 | 11/735,977 | 11/736,527 | 11/753,566 | 11/754,359 | 11/778,061 |
| 11/765,398 | 11/778,556 | 11/829,937 | 11/780,470 | 11/866,399 | 11/223,262 | 11/223,018 |
| 11/223,114 | 11/955,366 | 11/223,022 | 11/223,021 | 11/223,020 | 11/223,019 | 11/014,730 |
| D541849 | 29/279,123 | 6,716,666 | 6,949,217 | 6,750,083 | 7,014,451 | 6,777,259 |
| 6,923,524 | 6,557,978 | 6,991,207 | 6,766,998 | 6,967,354 | 6,759,723 | 6,870,259 |
| 10/853,270 | 6,925,875 | 10/898,214 | 7,095,109 | 7,145,696 | 10/976,081 | 7,193,482 |
| 7,134,739 | 7,222,939 | 7,164,501 | 7,118,186 | 7,201,523 | 7,226,159 | 7,249,839 |
| 7,108,343 | 7,154,626 | 7,079,292 | 10/980,184 | 7,233,421 | 7,063,408 | 10/983,082 |
| 10/982,804 | 7,032,996 | 10/982,834 | 10/982,833 | 10/982,817 | 7,217,046 | 6,948,870 |
| 7,195,336 | 7,070,257 | 10/986,813 | 10/986,785 | 7,093,922 | 6,988,789 | 10/986,788 |
| 7,246,871 | 10/992,748 | 10/992,747 | 7,187,468 | 10/992,828 | 7,196,814 | 10/992,754 |
| 7,268,911 | 7,265,869 | 7,128,384 | 7,164,505 | 7,284,805 | 7,025,434 | 7,298,519 |
| 7,280,244 | 7,206,098 | 7,265,877 | 7,193,743 | 7,168,777 | 11/006,734 | 7,195,329 |
| 7,198,346 | 7,281,786 | 11/013,363 | 11/013,881 | 6,959,983 | 7,128,386 | 7,097,104 |
| 11/013,636 | 7,083,261 | 7,070,258 | 7,083,275 | 7,110,139 | 6,994,419 | 6,935,725 |
| 11/026,046 | 7,178,892 | 7,219,429 | 6,988,784 | 11/026,135 | 7,289,156 | 11/064,005 |
| 7,284,976 | 7,178,903 | 7,273,274 | 7,083,256 | 11/064,008 | 7,278,707 | 11/064,013 |
| 6,974,206 | 11/064,004 | 7,066,588 | 7,222,940 | 11/075,918 | 7,018,025 | 7,221,867 |
| 7,290,863 | 7,188,938 | 7,021,742 | 7,083,262 | 7,192,119 | 11/083,021 | 7,036,912 |
| 7,175,256 | 7,182,441 | 7,083,258 | 7,114,796 | 7,147,302 | 11/084,757 | 7,219,982 |
| 7,118,195 | 7,229,153 | 6,991,318 | 7,108,346 | 11/248,429 | 11/239,031 | 7,178,899 |
| 7,066,579 | 11/281,419 | 11/298,633 | 11/329,188 | 11/329,140 | 7,270,397 | 7,258,425 |
| 7,237,874 | 7,152,961 | 11/478,592 | 7,207,658 | 11/484,744 | 7,311,257 | 7,207,659 |
| 11/525,857 | 11/540,569 | 11/583,869 | 11/592,985 | 11/585,947 | 7,306,307 | 11/604,316 |
| 11/604,309 | 11/604,303 | 11/643,844 | 11/650,553 | 11/655,940 | 11/653,320 | 7,278,713 |
| 11/706,381 | 11/706,323 | 11/706,963 | 11/713,660 | 7,290,853 | 11/696,186 | 11/730,390 |
| 11/737,139 | 11/737,749 | 11/740,273 | 11/749,122 | 11/754,361 | 11/766,043 | 11/764,775 |
| 11/768,872 | 11/775,156 | 11/779,271 | 11/779,272 | 11/829,938 | 11/839,502 | 11/858,852 |
| 11/862,188 | 11/859,790 | 11/872,618 | 11/923,651 | 11/950,255 | 11/930,001 | 11/955,362 |
| 11/965,718 | 6,485,123 | 6,425,657 | 6,488,358 | 7,021,746 | 6,712,986 | 6,981,757 |
| 6,505,912 | 6,439,694 | 6,364,461 | 6,378,990 | 6,425,658 | 6,488,361 | 6,814,429 |
| 6,471,336 | 6,457,813 | 6,540,331 | 6,454,396 | 6,464,325 | 6,443,559 | 6,435,664 |
| 6,412,914 | 6,488,360 | 6,550,896 | 6,439,695 | 6,447,100 | 09/900,160 | 6,488,359 |
| 6,637,873 | 10/485,738 | 6,618,117 | 10/485,737 | 6,803,989 | 7,234,801 | 7,044,589 |
| 7,163,273 | 6,416,154 | 6,547,364 | 10/485,744 | 6,644,771 | 7,152,939 | 6,565,181 |
| 10/485,805 | 6,857,719 | 7,255,414 | 6,702,417 | 7,284,843 | 6,918,654 | 7,070,265 |
| 6,616,271 | 6,652,078 | 6,503,408 | 6,607,263 | 7,111,924 | 6,623,108 | 6,698,867 |
| 6,488,362 | 6,625,874 | 6,921,153 | 7,198,356 | 6,536,874 | 6,425,651 | 6,435,667 |
| 10/509,997 | 6,527,374 | 10/510,154 | 6,582,059 | 10/510,152 | 6,513,908 | 7,246,883 |
| 6,540,332 | 6,547,368 | 7,070,256 | 6,508,546 | 10/510,151 | 6,679,584 | 10/510,000 |
| 6,857,724 | 10/509,998 | 6,652,052 | 10/509,999 | 6,672,706 | 10/510,096 | 6,688,719 |
| 6,712,924 | 6,588,886 | 7,077,508 | 7,207,654 | 6,935,724 | 6,927,786 | 6,988,787 |
| 6,899,415 | 6,672,708 | 6,644,767 | 6,874,866 | 6,830,316 | 6,994,420 | 6,954,254 |
| 7,086,720 | 7,240,992 | 7,267,424 | 7,128,397 | 7,084,951 | 7,156,496 | 7,066,578 |
| 7,101,023 | 11/165,027 | 11/202,235 | 11/225,157 | 7,159,965 | 7,255,424 | 11/349,519 |
| 7,137,686 | 7,201,472 | 7,287,829 | 11/504,602 | 7,216,957 | 11/520,572 | 11/583,858 |
| 11/583,895 | 11/585,976 | 11/635,488 | 7,278,712 | 11/706,952 | 11/706,307 | 7,287,827 |
| 11/944,451 | 11/740,287 | 11/754,367 | 11/758,643 | 11/778,572 | 11/859,791 | 11/863,260 |
| 11/874,178 | 11/936,064 | 11/951,983 | 6,916,082 | 6,786,570 | 10/753,478 | 6,848,780 |
| 6,966,633 | 7,179,395 | 6,969,153 | 6,979,075 | 7,132,056 | 6,832,828 | 6,860,590 |
| 6,905,620 | 6,786,574 | 6,824,252 | 7,097,282 | 6,997,545 | 6,971,734 | 6,918,652 |
| 6,978,990 | 6,863,105 | 10/780,624 | 7,194,629 | 10/791,792 | 6,890,059 | 6,988,785 |
| 6,830,315 | 7,246,881 | 7,125,102 | 7,028,474 | 7,066,575 | 6,986,202 | 7,044,584 |
| 7,210,762 | 7,032,992 | 7,140,720 | 7,207,656 | 7,285,170 | 11/048,748 | 7,008,041 |
| 7,011,390 | 7,048,868 | 7,014,785 | 7,131,717 | 7,284,826 | 11/176,158 | 7,182,436 |
| 7,104,631 | 7,240,993 | 7,290,859 | 11/202,217 | 7,172,265 | 7,284,837 | 7,066,576 |
| 11/298,635 | 7,152,949 | 11/442,161 | 11/442,133 | 11/442,126 | 7,156,492 | 11/478,588 |
| 11/505,848 | 7,287,834 | 11/525,861 | 11/583,939 | 11/545,504 | 7,284,326 | 11/635,485 |
| 11/730,391 | 11/730,788 | 11/749,148 | 11/749,149 | 11/749,152 | 11/749,151 | 11/759,886 |
| 11/865,668 | 11/874,168 | 11/874,203 | 11/965,722 | 6,824,257 | 7,270,475 | 6,971,811 |
| 6,878,564 | 6,921,145 | 6,890,052 | 7,021,747 | 6,929,345 | 6,811,242 | 6,916,087 |
| 6,905,195 | 6,899,416 | 6,883,906 | 6,955,428 | 7,284,834 | 6,932,459 | 6,962,410 |
| 7,033,008 | 6,962,409 | 7,013,641 | 7,204,580 | 7,032,997 | 6,998,278 | 7,004,563 |
| 6,910,755 | 6,969,142 | 6,938,994 | 7,188,935 | 10/959,049 | 7,134,740 | 6,997,537 |
| 7,004,567 | 6,916,091 | 7,077,588 | 6,918,707 | 6,923,583 | 6,953,295 | 6,921,221 |
| 7,001,008 | 7,168,167 | 7,210,759 | 11/008,115 | 11/011,120 | 11/012,329 | 6,988,790 |
| 7,192,120 | 7,168,789 | 7,004,577 | 7,052,120 | 11/123,007 | 6,994,426 | 7,258,418 |
| 7,014,298 | 11/124,348 | 11/177,394 | 7,152,955 | 7,097,292 | 7,207,657 | 7,152,944 |
| 7,147,303 | 11/209,712 | 7,134,608 | 7,264,333 | 7,093,921 | 7,077,590 | 7,147,297 |
| 11/239,029 | 11/248,832 | 11/248,428 | 11/248,434 | 7,077,507 | 7,172,672 | 7,175,776 |
| 7,086,717 | 7,101,020 | 11/329,155 | 7,201,466 | 11/330,057 | 7,152,967 | 7,182,431 |
| 7,210,666 | 7,252,367 | 7,287,837 | 11/485,255 | 11/525,860 | 6,945,630 | 7,018,294 |
| 6,910,014 | 6,659,447 | 6,648,321 | 7,082,980 | 6,672,584 | 7,073,551 | 6,830,395 |
| 7,289,727 | 7,001,011 | 6,880,922 | 6,886,915 | 6,644,787 | 6,641,255 | 7,066,580 |
| 6,652,082 | 7,284,833 | 6,666,544 | 6,666,543 | 6,669,332 | 6,984,023 | 6,733,104 |
| 6,644,793 | 6,723,575 | 6,953,235 | 6,663,225 | 7,076,872 | 7,059,706 | 7,185,971 |
| 7,090,335 | 6,854,827 | 6,793,974 | 10/636,258 | 7,222,929 | 6,739,701 | 7,073,881 |
| 7,155,823 | 7,219,427 | 7,008,503 | 6,783,216 | 6,883,890 | 6,857,726 | 10/636,274 |

-continued

| | | | | | | |
|---|---|---|---|---|---|---|
| 6,641,256 | 6,808,253 | 6,827,428 | 6,802,587 | 6,997,534 | 6,959,982 | 6,959,981 |
| 6,886,917 | 6,969,473 | 6,827,425 | 7,007,859 | 6,802,594 | 6,792,754 | 6,860,107 |
| 6,786,043 | 6,863,378 | 7,052,114 | 7,001,007 | 10/729,151 | 10/729,157 | 6,948,794 |
| 6,805,435 | 6,733,116 | 10/683,006 | 7,008,046 | 6,880,918 | 7,066,574 | 6,983,595 |
| 6,923,527 | 7,275,800 | 7,163,276 | 7,156,495 | 6,976,751 | 6,994,430 | 7,014,296 |
| 7,059,704 | 7,160,743 | 7,175,775 | 7,287,839 | 7,097,283 | 7,140,722 | 11/123,009 |
| 11/123,008 | 7,080,893 | 7,093,920 | 7,270,492 | 7,128,093 | 7,052,113 | 7,055,934 |
| 11/155,627 | 7,278,796 | 11/159,197 | 7,083,263 | 7,145,592 | 7,025,436 | 11/281,444 |
| 7,258,421 | 11/478,591 | 11/478,735 | 7,226,147 | 11/482,940 | 7,195,339 | 11/503,061 |
| 11/505,938 | 7,284,838 | 7,293,856 | 11/544,577 | 11/540,576 | 11/585,964 | 11/592,991 |
| 11/599,342 | 11/600,803 | 11/604,321 | 11/604,302 | 11/635,535 | 11/635,486 | 11/643,842 |
| 11/655,987 | 11/650,541 | 11/706,301 | 11/707,039 | 11/730,388 | 11/730,786 | 11/730,785 |
| 11/739,080 | 11/764,746 | 11/768,875 | 11/779,847 | 11/829,940 | 11/847,240 | 11/834,625 |
| 11/863,210 | 11/865,680 | 11/874,156 | 11/923,602 | 11/951,940 | 11/954,988 | 11/961,662 |
| 7,067,067 | 6,776,476 | 6,880,914 | 7,086,709 | 6,783,217 | 7,147,791 | 6,929,352 |
| 7,144,095 | 6,820,974 | 6,918,647 | 6,984,016 | 7,192,125 | 6,824,251 | 6,834,939 |
| 6,840,600 | 6,786,573 | 7,144,519 | 6,799,835 | 6,959,975 | 6,959,974 | 7,021,740 |
| 6,935,718 | 6,938,983 | 6,938,991 | 7,226,145 | 7,140,719 | 6,988,788 | 7,022,250 |
| 6,929,350 | 7,011,393 | 7,004,566 | 7,175,097 | 6,948,799 | 7,143,944 | 7,310,157 |
| 7,029,100 | 6,957,811 | 7,073,724 | 7,055,933 | 7,077,490 | 7,055,940 | 10/991,402 |
| 7,234,645 | 7,032,999 | 7,066,576 | 7,229,150 | 7,086,728 | 7,246,879 | 7,284,825 |
| 7,140,718 | 7,284,817 | 7,144,098 | 7,044,577 | 7,284,824 | 7,284,827 | 7,189,334 |
| 7,055,935 | 7,152,860 | 11/203,188 | 11/203,173 | 11/202,343 | 7,213,989 | 11/225,156 |
| 11/225,173 | 7,300,141 | 7,114,868 | 7,168,796 | 7,159,967 | 11/272,425 | 7,152,805 |
| 11/298,530 | 11/330,061 | 7,133,799 | 11/330,054 | 11/329,284 | 7,152,956 | 7,128,399 |
| 7,147,305 | 7,287,702 | 11/442,160 | 7,246,884 | 7,152,960 | 11/442,125 | 11/454,901 |
| 11/442,134 | 11/450,441 | 11/474,274 | 11/499,741 | 7,270,399 | 6,857,728 | 6,857,729 |
| 6,857,730 | 6,989,292 | 7,126,216 | 6,977,189 | 6,982,189 | 7,173,332 | 7,026,176 |
| 6,979,599 | 6,812,062 | 6,886,751 | 10/804,057 | 10/804,036 | 7,001,793 | 6,866,369 |
| 6,946,743 | 10/804,048 | 6,886,918 | 7,059,720 | 10/846,561 | 10/846,562 | 10/846,647 |
| 10/846,649 | 10/846,627 | 6,951,390 | 6,981,765 | 6,789,881 | 6,802,592 | 7,029,097 |
| 6,799,836 | 7,048,352 | 7,182,267 | 7,025,279 | 6,857,571 | 6,817,539 | 6,830,198 |
| 6,992,791 | 7,038,809 | 6,980,323 | 7,148,992 | 7,139,091 | 6,947,173 | 7,101,034 |
| 6,969,144 | 6,942,319 | 6,827,427 | 6,984,021 | 6,984,022 | 6,869,167 | 6,918,542 |
| 7,007,852 | 6,899,420 | 6,918,665 | 6,997,625 | 6,988,840 | 6,984,080 | 6,845,978 |
| 6,848,687 | 6,840,512 | 6,863,365 | 7,204,582 | 6,921,150 | 7,128,396 | 6,913,347 |
| 7,008,819 | 6,935,736 | 6,991,317 | 7,284,836 | 7,055,947 | 7,093,928 | 7,100,934 |
| 7,270,396 | 7,187,086 | 7,290,856 | 7,032,825 | 7,086,721 | 7,159,968 | 7,010,456 |
| 7,147,307 | 7,111,925 | 11/144,812 | 7,229,154 | 11/505,849 | 11/520,570 | 11/520,575 |
| 11/546,437 | 11/540,575 | 11/583,937 | 7,278,711 | 7,290,720 | 11/592,207 | 11/635,489 |
| 11/604,319 | 11/635,490 | 11/635,525 | 7,287,706 | 11/706,366 | 11/706,310 | 11/706,308 |
| 11/785,108 | 11/744,214 | 11/744,218 | 11/748,485 | 11/748,490 | 11/764,778 | 11/766,025 |
| 11/834,635 | 11/839,541 | 11/860,420 | 11/865,693 | 11/863,118 | 11/866,307 | 11/866,340 |
| 11/869,684 | 11/869,722 | 11/869,694 | 11/876,592 | 11/945,244 | 11/951,121 | 11/945,238 |
| 11/955,358 | 11/965,710 | 11/962,050 | | | | |

BACKGROUND

The Applicant has previously described a method of enabling users to access information from a computer system via a printed substrate e.g. paper. The substrate has coded data printed thereon, which is read by an optical sensing device when the user interacts with the substrate using the sensing device. A computer receives interaction data from the sensing device and uses this data to determine what action is being requested by the user. For example, a user may make handwritten input onto a form or make a selection gesture around a printed item. This input is interpreted by the computer system with reference to a page description corresponding to the printed substrate.

It would be desirable to provide a broader range of functionalities available to the user via the sensing device. It would be particularly desirable to provide this broader range of functionalities without introducing a plethora of separate functional systems into the sensing device.

SUMMARY OF INVENTION

In a first aspect the present invention provides a system for controlling movement of a cursor on a display device, the system comprising:
a substrate having a position-coding pattern disposed on or in a surface thereof;
a sensing device comprising:
an image sensor for optically imaging the position-coding pattern; and
a processor configured for:
generating absolute motion data by determining a plurality of absolute positions of the sensing device relative to the surface using the imaged position-coding pattern;
generating orientation data indicative of an orientation of the sensing device relative to the substrate; and
using the orientation data to translate the absolute motion data into relative motion data, said relative motion data being indicative of relative motion of the sensing device from the perspective of a user; and
communication means for communicating the relative motion data to a computer system; and
the computer system configured for:
receiving said relative motion data from the sensing device;
interpreting said relative motion data as cursor movement; and
generating cursor control commands for said display device.

Optionally, the relative motion data is indicative of relative position changes of the sensing device substantially from a perspective of a user, and irrespective of an orientation of said substrate.

Optionally, the position-coding pattern comprises a plurality of tags, each tag identifying a location on the surface and a rotational orientation of the tag relative to the substrate, thereby enabling a yaw of the sensing device relative to the substrate to be determined.

Optionally, said display device is selected from at least one of:
 a display device associated with the computer system
 a display device integral with the computer system; and
 a display device remote from the computer system.

Optionally, said sensing device is operable in a plurality of modes, said plurality including a cursor mode and at least one other mode, and wherein the computer system is further configured for:
 determining that said sensing device is operating in a cursor mode.

Optionally, said at least one other mode is selected from the group comprising: a scroll mode; a hyperlinking mode; a searching mode; a content-extraction mode; and a handwriting mode.

Optionally, said sensing device comprises a mode selector, and said interaction data comprises mode data indicative of said cursor mode.

Optionally, said mode selector comprises at least one of:
 one or more mode buttons operable by a user; and
 a sensor for detecting a force exerted by said sensing device on said surface.

Optionally, said computer system is configured for retrieving stored mode data indicative of a most recent mode selected for said sensing device.

Optionally, said computer system is further configured for:
 determining if said sensing device is positioned within a cursor zone of said substrate, said cursor zone being activated by determination of said cursor mode; and
 interpreting relative motion of said sensing device only within said cursor zone as said cursor movement.

Optionally, said computer system is further configured for:
 determining if said sensing device is positioned within a scroll zone of said substrate, said scroll zone being activated by determination of said cursor mode; and
 interpreting the interaction of said sensing device within said scroll zone as a scroll action;
 scrolling a page displayed on said display device according to said scroll action.

Optionally, said computer system is configured for at least one of:
 interpreting at least one absolute position of said sensing device within said scroll zone to be indicative of a scroll direction; and
 interpreting relative motion of said sensing device within said scroll zone to be indicative of a scroll direction.

Optionally, the position-coding pattern is further indicative of an identity of the substrate and the interaction data comprises substrate identity data.

Optionally, the substrate is a cursor control substrate and said computer system is configured for using the substrate identity data to retrieve a cursor page description corresponding to said cursor control substrate, said cursor page description comprising a cursor zone within which the interaction of said sensing device is interpreted as said cursor movement.

Optionally, said cursor page description comprises a scroll zone within which the interaction of said sensing device is interpreted as a scroll action, and wherein said computer system is configured to scroll a page displayed on said display device according to said scroll action.

Optionally, said cursor control substrate has visible markings indicating at least one of: said cursor zone, said scroll zone and a scroll direction.

Optionally, said scroll zone is located at an edge region of said substrate.

In a further aspect the present invention provides a method of controlling movement of a cursor on a display device via a substrate having a position-coding pattern disposed on or in a surface thereof, said method comprising the steps of:
 receiving, in a computer system, interaction data indicative of an interaction of the sensing device with the substrate, said interaction data comprising:
  absolute motion data indicative of a plurality of absolute positions of the sensing device relative to the surface; and
  orientation data indicative of an orientation of the sensing device relative to the substrate; and
 using the orientation data to translate the absolute motion data into relative motion data, said relative motion data being indicative of position changes of the sensing device relative to itself;
 interpreting said relative motion data as cursor movement; and
 generating cursor control commands for said display device.

In another aspect the present invention provides a sensing device for controlling movement of a cursor on a display device, said sensing device comprising:
 an image sensor for optically imaging a position-coding pattern disposed on or in a surface; and
 a processor configured for:
  generating absolute motion data by determining a plurality of absolute positions of the sensing device relative to the surface using the imaged position-coding pattern;
  generating orientation data indicative of an orientation of the sensing device relative to the substrate; and
  using the orientation data to translate the absolute motion data into relative motion data, said relative motion data being indicative of relative motion of the sensing device from the perspective of a user; and
 communication means for communicating the relative motion data to a computer system, thereby enabling the computer system to generate cursor control commands using the relative motion data for controlling movement of the cursor on the display device.

In a another aspect the present invention provides a computer system for controlling movement of a cursor on a display device via a substrate having a position-coding pattern disposed on or in a surface thereof, said computer system being configured for:
 receiving interaction data indicative of an interaction of the sensing device with the substrate, said interaction data comprising:
  absolute motion data indicative of a plurality of absolute positions of the sensing device relative to the surface; and
  orientation data indicative of an orientation of the sensing device relative to the substrate;
 using the orientation data to translate the absolute motion data into relative motion data, said relative motion data being indicative of position changes of the sensing device relative to itself;
 interpreting said relative motion data as cursor movement; and generating cursor control commands for said display device.

In a second aspect the present invention provides a sensing device for interaction with a surface, said sensing device having automatic mode selection, said sensing device comprising:
- an image sensor for imaging the surface and generating image data;
- a motion sensor configured for determining one or more relative position changes of the sensing device;
- a processor configured for:
  - receiving the image data; and
  - automatically selecting, using said image data, either an interaction mode or a cursor mode for said sensing device; and
- communication means for transmitting either interaction data or cursor data to a computer system, dependent on said selected mode, wherein said processor is configured to:
- select the interaction mode and generate interaction data from the image data if said image data indicates that said sensing device is interacting with a first surface having a position-coding pattern disposed thereon, said interaction data being indicative of at least one absolute location of the sensing device relative to the surface; and
- select the cursor mode if said image data indicates that said sensing device is interacting with a second surface lacking a position-coding pattern, said cursor data being indicative of said one or more relative position changes of the sensing device.

Optionally, the motion sensor is selected from any one of the group comprising: at least one accelerometer; a mechanical mouse; an optical mouse; and a point interferometry device.

Optionally, said motion sensor is an optical mouse utilizing at least one of: a pattern-based optical mouse technique; a texture-based optical mouse technique; and a laser-speckle-based optical mouse technique.

Optionally, the position-coding pattern of the first surface is indicative of a plurality of locations on the surface and of an identity of a region.

Optionally, in said interaction mode, said processor is configured for determining the identity of the region using the imaged position-coding pattern, and said interaction data is further indicative of the identity of the region.

Optionally, the identity of the region is coincident with an identity of the surface.

Optionally, the position-coding pattern is comprised of a plurality of tags, each tag identifying the identity of the surface and a location of the tag on the surface.

In a further aspect the present invention provides a system for initiating an action corresponding to interaction of a sensing device relative to a surface, said system comprising:
(A) the sensing device comprising:
- an image sensor for imaging the surface and generating image data;
- a motion sensor configured for determining one or more relative position changes of the sensing device;
- a processor configured for:
  - receiving the image data; and
  - automatically selecting, using said image data, either an interaction mode or a cursor mode for said sensing device; and
- communication means for transmitting either interaction data or cursor data to a computer system, dependent on said selected mode, wherein said processor is configured to:
- select the interaction mode and generate interaction data if said image data indicates that said sensing device is interacting with a first surface having a position-coding pattern disposed thereon, said interaction data being indicative of an absolute location of the sensing device relative to the surface; and
- select the cursor mode if said image data indicates that said sensing device is interacting with a second surface lacking a position-coding pattern, said cursor data being indicative of said one or more relative position changes of the sensing device; and (B) the computer system configured for:
- receiving the interaction data and the cursor data from the sensing device;
- interpreting said interaction data to initiate an action corresponding to said interaction with said surface; and
- interpreting said cursor data to control movement of a cursor on a display device.

Optionally, said action initiated by said interaction data is selected from at least one of: hyperlinking; form-filling; searching; and content-extraction.

Optionally, the position-coding pattern of the first surface is indicative of a plurality of locations on the surface and of an identity of a region.

Optionally, in said interaction mode, said processor is configured for determining the identity of the region using the imaged position-coding pattern, and said interaction data is further indicative of the identity of the region.

Optionally, said computer system is configured to interpret said interaction data by the steps of:
- identifying and retrieving a page description corresponding to the first surface using the identity of the region;
- determining a request using the retrieved page description and the interaction data; and
- initiating an action based on said request.

Optionally, the identity of the region is coincident with an identity of the surface.

Optionally, the position-coding pattern is comprised of a plurality of tags, each tag identifying the identity of the surface and a location of the tag on the surface.

Optionally, display device is selected from at least one of:
- a display device associated with the computer system
- a display device integral with the computer system; and
- a display device remote from the computer system.

In a further aspect the present invention provides a method of automatically selecting a mode of a sensing device interacting with a surface, said sensing device comprising a motion sensor configured for determining one or more relative position changes of the sensing device, said method comprising the steps of:
- imaging the surface and generating image data;
- automatically selecting, using said image data, either an interaction mode or a cursor mode for said sensing device; and
- transmitting either interaction data or cursor data to a computer system, dependent on said selected mode, wherein:
- the interaction mode is selected and the interaction data is generated from the image data if said image data indicates that said sensing device is interacting with a first surface having a position-coding pattern disposed thereon, said interaction data being indicative of at least one absolute location of the sensing device relative to the surface; and
- the cursor mode is selected and one or more relative position changes of the sensing device are determined if said image data indicates that said sensing device is interacting with a second surface lacking a position-coding pattern, said cursor data being indicative of said one or more relative position changes of the sensing device.

In a further aspect the method further comprising the steps of:
receiving the interaction data in the computer system; and
interpreting said interaction data to initiate an action corresponding to said interaction with said surface.

In another aspect the method further comprising the steps of:
receiving the cursor data from the sensing device;
interpreting said cursor data to control movement of a cursor on a display device.

In a third aspect the present invention provides a system for enabling scrolling of a page displayed on a display device, the system comprising:
a substrate having a position-coding pattern disposed on or in a surface thereof;
a sensing device operable in a plurality of modes including a cursor mode, said sensing device comprising:
an image sensor for optically imaging the position-coding pattern; and
a processor configured for generating interaction data indicative of an interaction of the sensing device with the surface, said interaction data being indicative of a position or movement of the sensing device relative to the surface;
communication means for communicating the interaction data to a computer system; and
the computer system configured for:
receiving the interaction data from the sensing device;
determining that said sensing device is operating in a cursor mode;
determining a scroll zone for said substrate;
determining if said sensing device is positioned within said scroll zone;
interpreting said position or movement of said sensing device within said scroll zone as a scrolling action; and
generating a scroll control command for said display device so as to scroll said displayed page.

Optionally, the sensing device is operable in two or more modes selected from the group comprising: said cursor mode; a hyperlinking mode; a searching mode; a content-extraction mode; and a handwriting mode.

Optionally, said sensing device comprises a mode selector, and said interaction data comprises mode data indicative of said cursor mode.

Optionally, said mode selector comprises at least one of:
one or more mode buttons operable by a user; and
a sensor for detecting a force exerted by said sensing device on said surface.

Optionally, said computer system is configured for retrieving stored mode data indicative of a most recent mode selected for said sensing device.

Optionally, said computer system is configured for at least one of:
interpreting at least one absolute position of said sensing device within said scroll zone to be indicative of a scroll direction; and
interpreting movement of said sensing device within said scroll zone to be indicative of a scroll direction.

Optionally, said scroll direction is selected from at least one of:
vertical scrolling;
horizontal scrolling; and
diagonal scrolling.

Optionally, said scroll zone is located at an edge region of said substrate.

Optionally, said substrate comprises a plurality of scroll zones.

Optionally, said substrate comprises visible markings indicating at least one of: said scroll zone and a scroll direction.

Optionally, said computer system is further configured for:
determining if said sensing device is positioned within a cursor zone of said substrate;
interpreting movement of said sensing device as a cursor movement; and
generating cursor control commands for said display device.

Optionally, said display device is selected from at least one of:
a display device associated with the computer system
a display device integral with the computer system; and
a display device remote from the computer system.

In a further aspect the system further comprising the display device.

Optionally, the position-coding pattern is further indicative of an identity of the substrate and the interaction data comprises substrate identity data.

Optionally, said computer system is configured for retrieving a page description corresponding to said substrate using said substrate identity.

Optionally, said computer is configured for retrieving said page description if it is determined that said sensing device is not operating in said cursor mode.

Optionally, said computer system is configured for:
using said position or movement of said sensing device together with said retrieved page description to interpret said interaction of said sensing device with said substrate; and
initiate an action corresponding to said interaction.

In another aspect the present invention provides a method of enabling scrolling of a page displayed on a display device via a substrate having position-coding pattern disposed in or on a surface thereof, said method comprising, in a computer system, the steps of:
receiving interaction data indicative of an interaction of the sensing device with the substrate, said interaction data being indicative of a position or movement of the sensing device relative to the surface;
determining that said sensing device is operating in a cursor mode;
determining a scroll zone for said substrate;
determining if said sensing device is positioned within a scroll zone of said substrate;
interpreting said position or movement of said sensing device within said scroll zone as a scrolling action; and
generating a scroll control command for said display device so as to scroll said displayed page.

In a further aspect the present invention provides a computer system for controlling scrolling of a page displayed on a display device, said computer system being configured for:
receiving interaction data indicative of an interaction of the sensing device with a substrate having a position-coding pattern disposed on or in a surface thereof, said interaction data being indicative of a position or movement of the sensing device relative to the surface;

determining that said sensing device is operating in a cursor mode;
determining a scroll zone for said substrate;
determining if said sensing device is positioned within a scroll zone of said substrate;
interpreting said position or movement of said sensing device within said scroll zone as a scrolling action; and
generating a scroll control command for said display device so as to scroll said displayed page.

In a fourth aspect the present invention provides a system for enabling user input and control of a cursor on a display device, the system comprising:
a substrate having a position-coding pattern disposed on or in a surface thereof, said substrate having at least one input element and a discrete cursor zone;
a sensing device comprising:
an image sensor for optically imaging the position-coding pattern; and
a processor configured for generating interaction data indicative of an interaction of the sensing device with the surface, said interaction data being indicative of a position or movement of the sensing device relative to the surface;
communication means for communicating the interaction data to a computer system; and
the computer system configured for:
receiving the interaction data from the sensing device;
retrieving a page description corresponding to said substrate;
determining whether said sensing device is positioned within said cursor zone;
interpreting movement of said sensing device within said cursor zone as a cursor movement and generating corresponding cursor control commands for said display device; and
otherwise determining if said position or movement of said sensing device is within a zone of said at least one input element and initiating an action corresponding to said at least one input element.

Optionally, said at least one user input element is a GUI control button and said action is a corresponding GUI control action.

Optionally, said GUI control action is selected from the group comprising: scrolling; web browser control; page up; page down; cut; copy; paste; tab between GUI applications; launching of a GUI application; volume control; log off; sleep; and keyboard input.

Optionally, said substrate is an explicitly dedicated GUI control substrate, said substrate comprising visible markings indicating said cursor zone and said at least one GUI control button.

Optionally, said at least one input element is a hyperlink element, and said action is hyperlinking.

Optionally, said substrate comprises a scroll zone, and said computer system is configured for interpreting a position or movement of said sensing device within said scroll zone to be indicative of a scrolling action.

Optionally, said computer system is configured for at least one of:
interpreting at least one absolute position of said sensing device within said scroll zone to be indicative of a scroll direction; and
interpreting movement of said sensing device within said scroll zone to be indicative of a scroll direction.

Optionally, said scroll direction is selected from at least one of:
vertical scrolling;
horizontal scrolling; and
diagonal scrolling.

Optionally, said substrate comprises a plurality of scroll zones.

Optionally, said substrate comprises visible markings indicating at least one of: said scroll zone and a scroll direction.

Optionally, said computer system is configured for interpreting movement of said sensing device within said cursor zone as relative movement.

Optionally, said computer system is configured for interpreting the position or movement of said sensing device outside said cursor zone as an absolute position or movement relative to the surface.

Optionally, said display device is selected from at least one of:
a display device associated with the computer system
a display device integral with the computer system; and
a display device remote from the computer system.

In a further aspect the system further comprising the display device.

Optionally, the position-coding pattern is further indicative of an identity of the substrate and the interaction data comprises substrate identity data.

Optionally, said computer system is configured for retrieving the page description corresponding to said substrate using said substrate identity.

In another aspect the present invention provides a method of enabling user input and control of a cursor on a display device via a substrate having position-coding pattern disposed in or on a surface thereof, said substrate having at least one input element and a discrete cursor zone, said method comprising, in a computer system, the steps of:
receiving interaction data indicative of an interaction of the sensing device with the substrate, said interaction data being indicative of a position or movement of the sensing device relative to the surface;
retrieving a page description corresponding to said substrate;
determining whether said sensing device is positioned within said cursor zone;
interpreting movement of said sensing device within said cursor zone as a cursor movement and generating corresponding cursor control commands for said display device; and
otherwise determining if said position or movement of said sensing device is within a zone of said at least one input element and initiating an action corresponding to said at least one input element.

In a further aspect the present invention provides a computer system for enabling user input and control of a cursor on a display device via a substrate having position-coding pattern disposed in or on a surface thereof, said substrate comprising at least one input element and a discrete cursor zone, said computer system being configured for:
receiving interaction data indicative of an interaction of the sensing device with the substrate, said interaction data being indicative of a position or movement of the sensing device relative to the surface;
retrieving a page description corresponding to said substrate;
determining whether said sensing device is positioned within said cursor zone;

interpreting movement of said sensing device within said cursor zone as a cursor movement and generating corresponding cursor control commands for said display device; and otherwise determining if said position or movement of said sensing device is within a zone of said at least one input element and initiating an action corresponding to said at least one input element.

BRIEF DESCRIPTION OF DRAWINGS

Preferred and other embodiments of the invention will now be described, by way of non-limiting example only, with reference to the accompanying drawings, in which:

FIG. 6C is a plan view showing an arrangement of nine of the tags shown in FIG. 6a where targets are shared between adjacent tags;

FIG. 6D is a plan view showing the interleaving and rotation of the symbols of the four codewords of the tag shown in FIG. 6a;

DETAILED DESCRIPTION OF PREFERRED AND OTHER EMBODIMENTS

Figure 1:
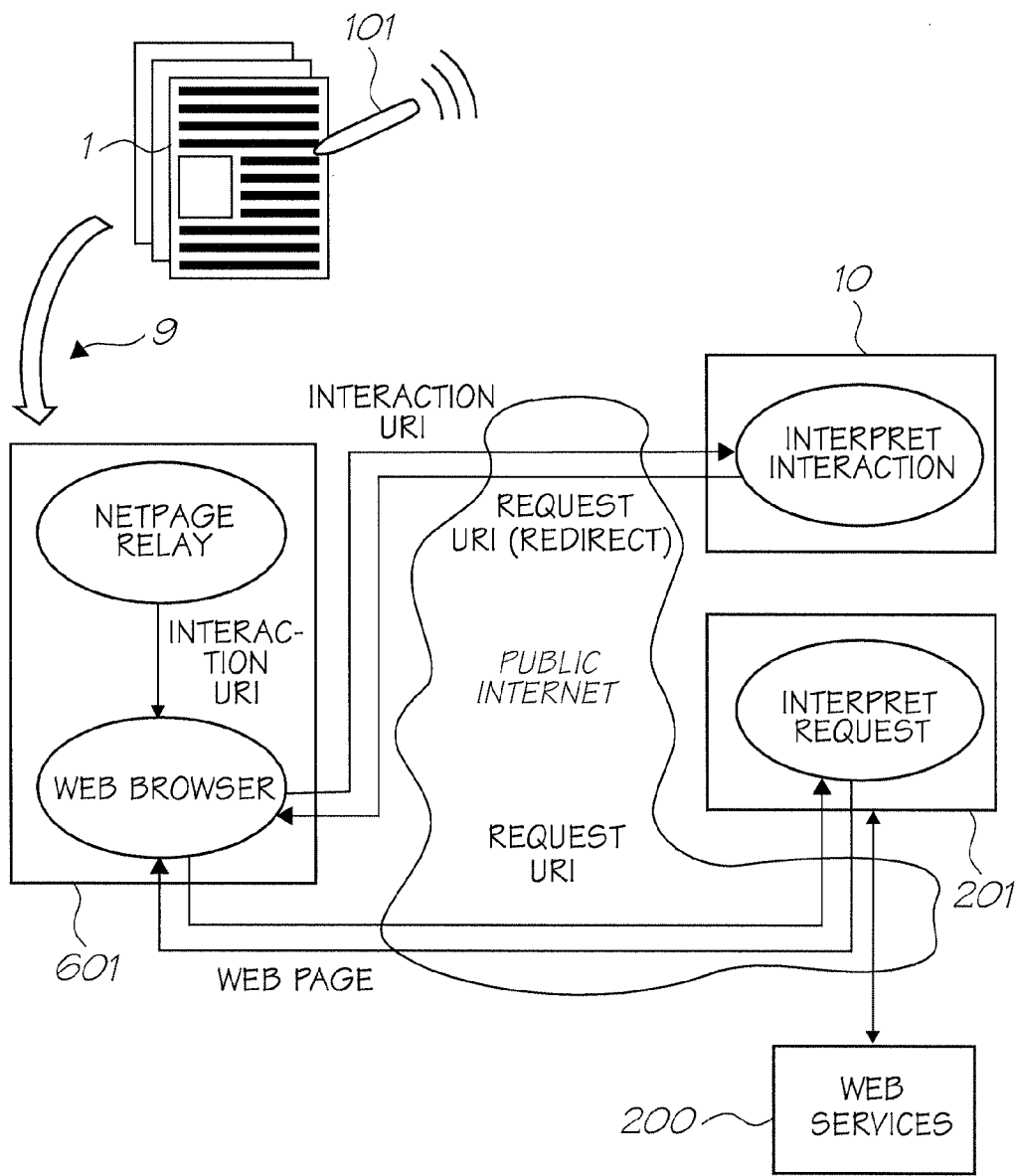
FIG. 1 shows an embodiment of basic netpage architecture.

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). References herein to "pen" or "netpage pen" are provided by way of example only. It will, of course, be appreciated that the pen may take the form of any of the sensing devices described above.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 2:
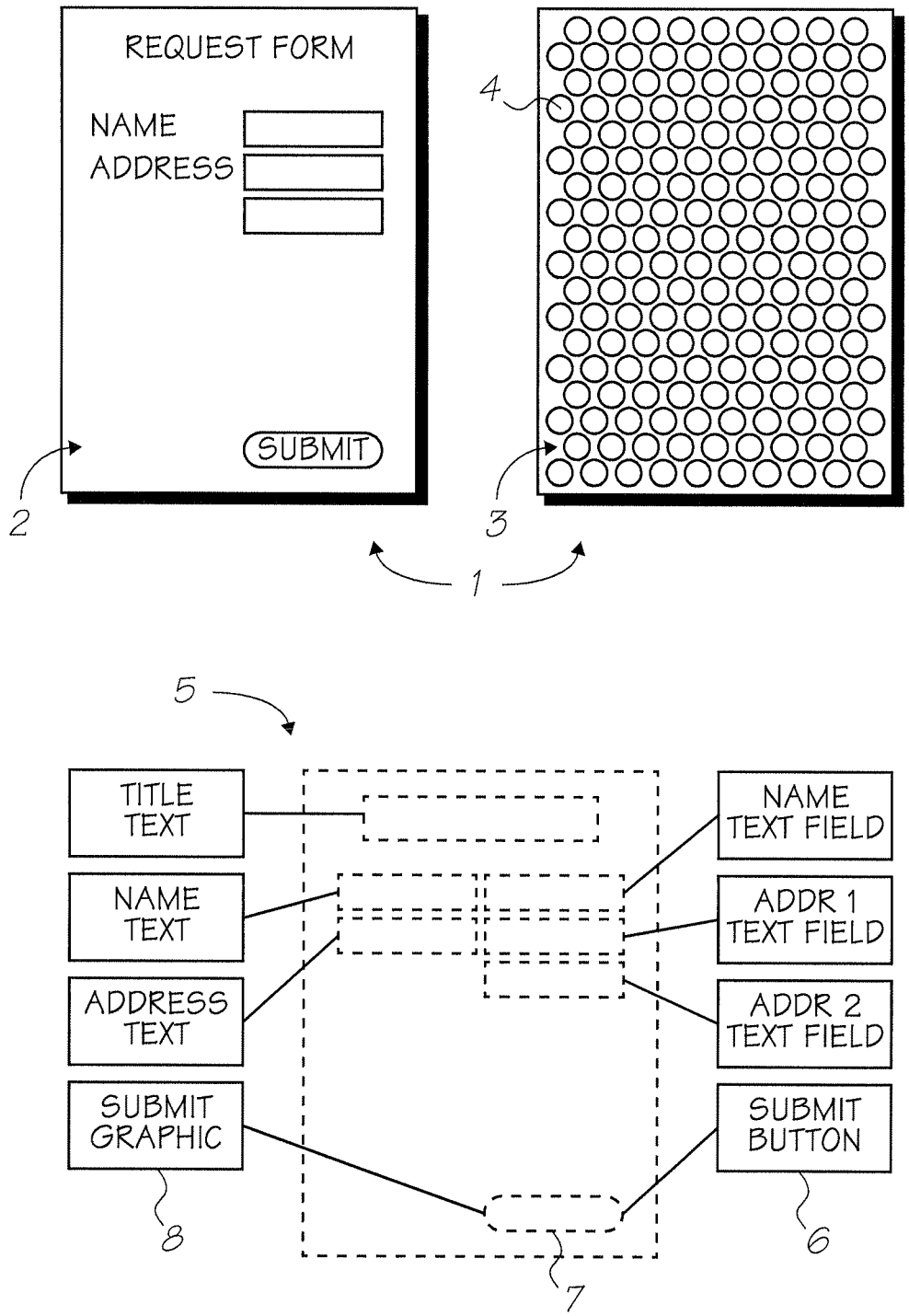
FIG. 2 is a schematic of a the relationship between a sample printed netpage and its online page description.

As illustrated in FIG. 2, a printed netpage 1 can represent an interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 3:
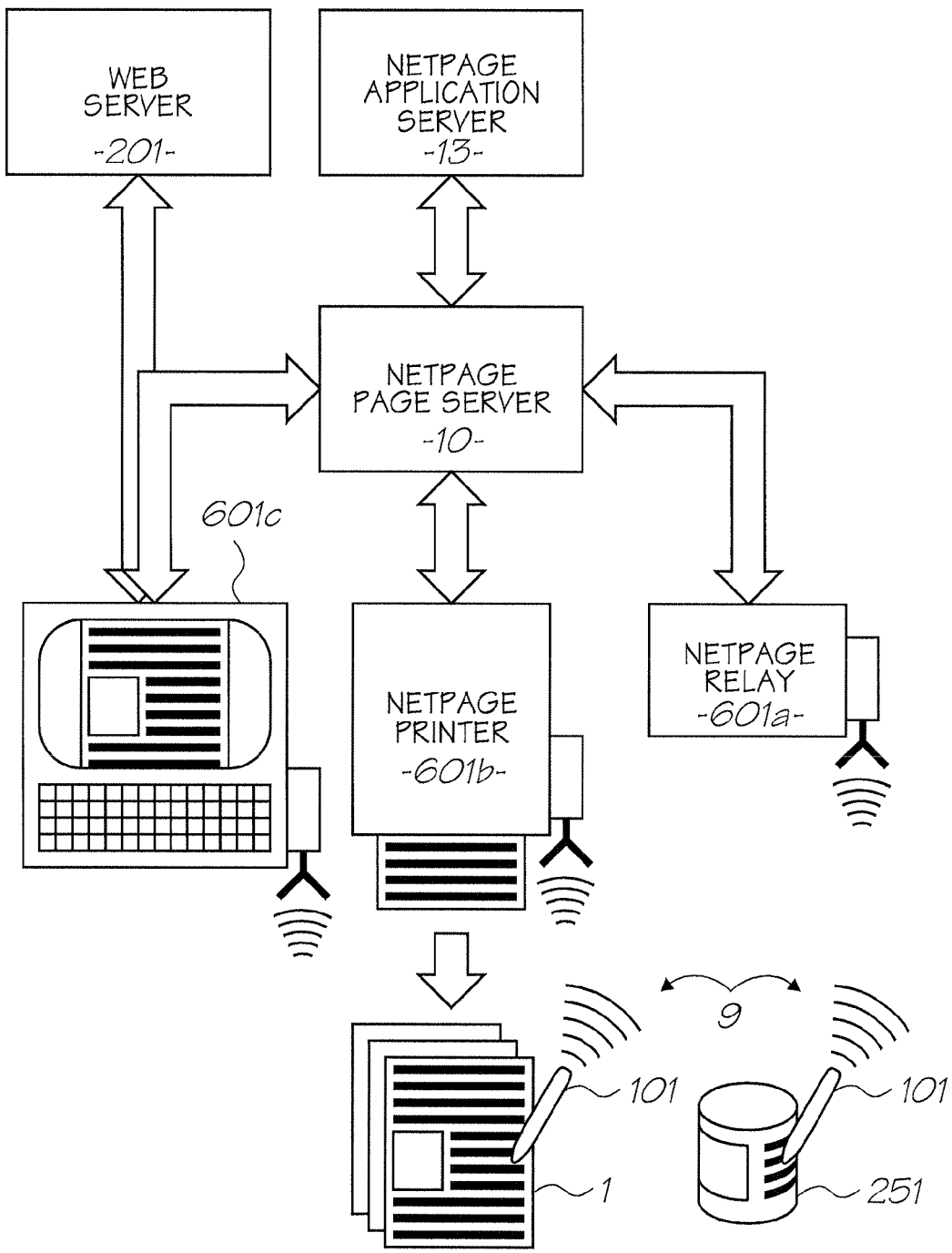
FIG. 3 shows an embodiment of basic netpage architecture with various alternatives for the relay device.
Figure 3A:
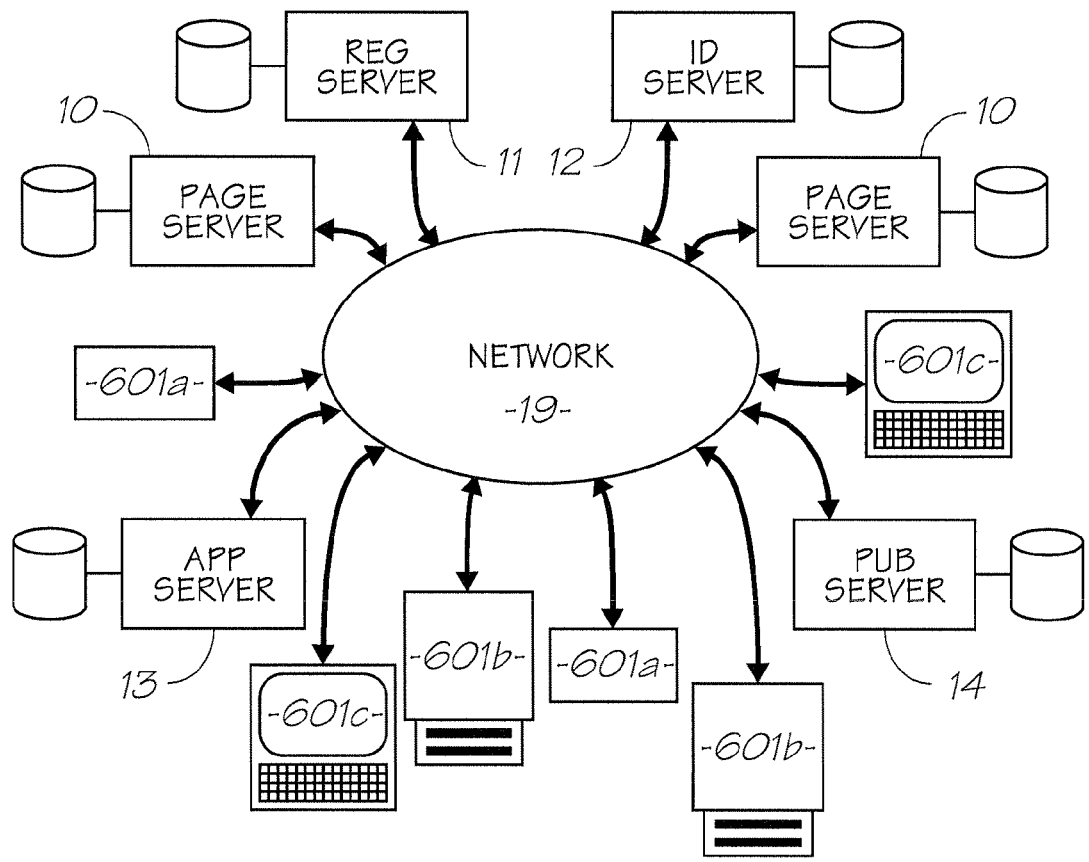
FIG. 3A illustrates a collection of netpage servers, Web terminals, printers and relays interconnected via a network.

As illustrated in FIGS. 1 and 3, a netpage sensing device 101, such as the pen shown in FIGS. 8 and 9 and described in more detail below, works in conjunction with a netpage relay device 601, which is an Internet-connected device for home, office or mobile use. The pen is wireless and communicates securely with the netpage relay device 601 via a short-range radio link 9. In an alternative embodiment, the netpage pen 101 utilises a wired connection, such as a USB or other serial connection, to the relay device 601.

The relay device 601 performs the basic function of relaying interaction data to a page server 10, which interprets the interaction data. As shown in FIG. 3, the relay device 601 may, for example, take the form of a personal computer 601a, a netpage printer 601b or some other relay 601c.

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 3, the netpage sensing device 101 interacts with the coded data on a printed netpage 1, or other printed substrate such as a label of a product item 251, and communicates, via a short-range radio link 9, the interaction to the relay 601. The relay 601 sends corresponding interaction data to the relevant netpage page server 10 for interpretation. Raw data received from the sensing device 101 may be relayed directly to the page server 10 as interaction data. Alternatively, the interaction data may be encoded in the form of an interaction URI and transmitted to the page server 10 via a user's web browser. Of course, the relay device 601 (e.g. mobile phone) may incorporate a web browser and a display device.

Interpretation of the interaction data by the page server 10 may result in direct access to information requested by the user. This information may be sent from the page server 10 to, for example, a user's display device (e.g. a display device associated with the relay device 601). The information sent to the user may be in the form of a webpage constructed by the page server 10 and the webpage may be constructed using information from external web services 200 (e.g. search engines) or local web resources accessible by the page server 10. In some circumstances, the page server 10 may access application computer software running on a netpage application server 13.

Alternatively, and as shown explicitly in FIG. 1, a two-step information retrieval process may be employed. Interaction data is sent from the sensing device 101 to the relay device 601 in the usual way. The relay device 601 then sends the interaction data to the page server 10 for interpretation with reference to the relevant page description 5. Then, the page server 10 forms a request (typically in the form of a request URI) and sends this request URI back to the user's relay device 601. A web browser running on the relay device 601 then sends the request URI to a netpage web server 201, which interprets the request. The netpage web server 201 may interact with local web resources and external web services 200 to interpret the request and construct a webpage. Once the webpage has been constructed by the netpage web server 201, it is transmitted to the web browser running on the user's relay device 601, which typically displays the webpage. This system architecture is particularly useful for performing searching via netpages, as described in our earlier U.S. patent application Ser. No. 11/672,950 filed on Feb. 8, 2007 (the contents of which is incorporated by reference). For example, the request URI may encode search query terms, which are searched via the netpage web server 201.

The netpage relay device 601 can be configured to support any number of sensing devices, and a sensing device can work with any number of netpage relays. In the preferred implementation, each netpage sensing device 101 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device. The pen is wireless and communicates with the netpage relay device via a short-range radio link. Tags are sufficiently small and densely arranged that the sensing device can reliably image at least one tag even on a single click on the page. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description for each printed netpage.

Figure 4:
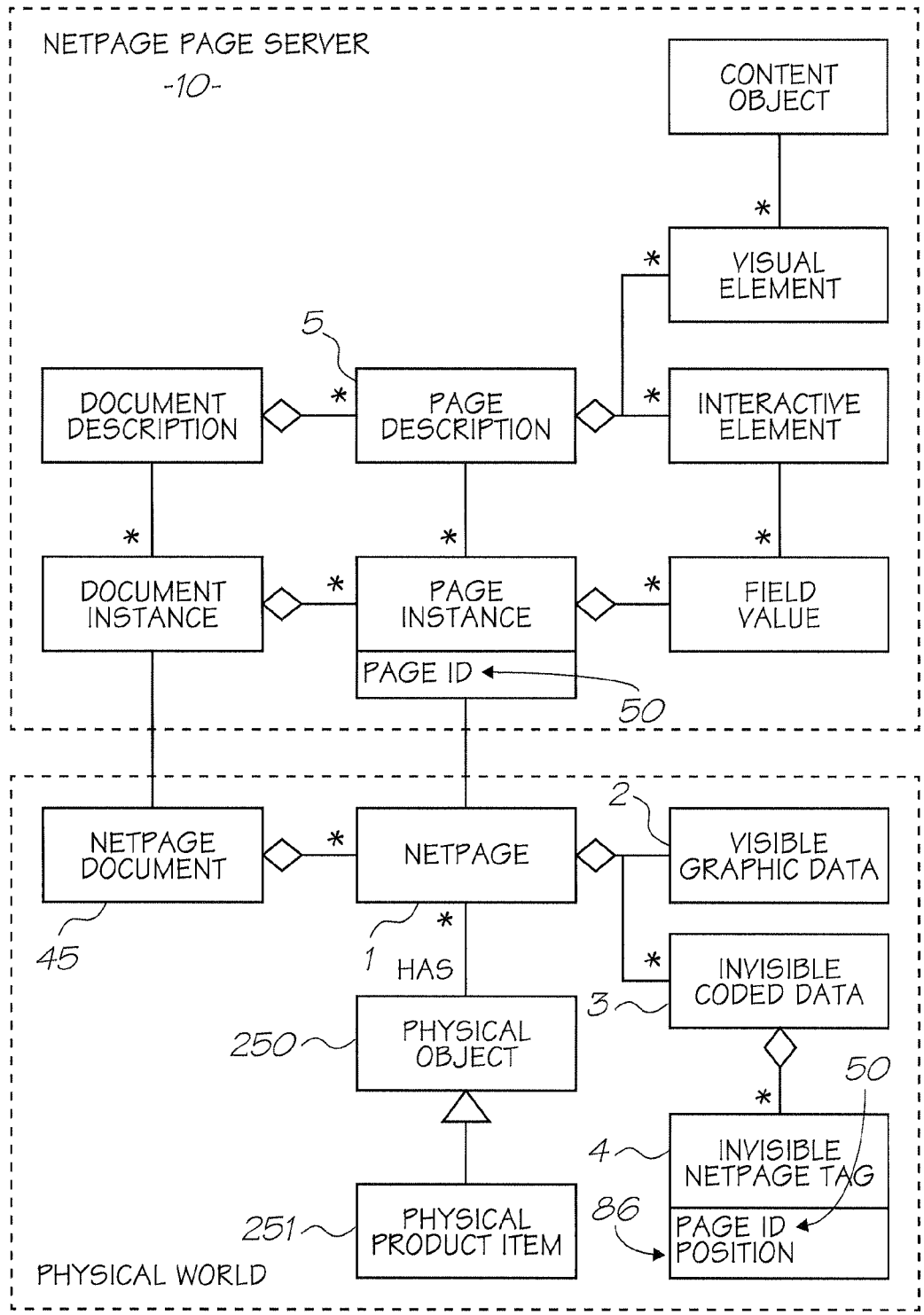
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance may be associated with both the netpage printer which printed it and, if known, the netpage user who requested it.

2 Netpage Tags 2.1 Tag Data Content

In a preferred form, each tag identifies the region in which it appears, and the location of that tag within the region and an orientation of the tag relative to a substrate on which the tag is printed. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag typically contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

| Tag data | |
|---|---|
| Field | Precision (bits) |
| Page ID / Region ID | 100 |
| Tag ID / x-y coordinates | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows $2^{100}$ (~$10^{30}$ or a million trillion trillion) different regions to be uniquely identified.

2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed- Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

2.3 Physical Tag Structure

Figure 5A:
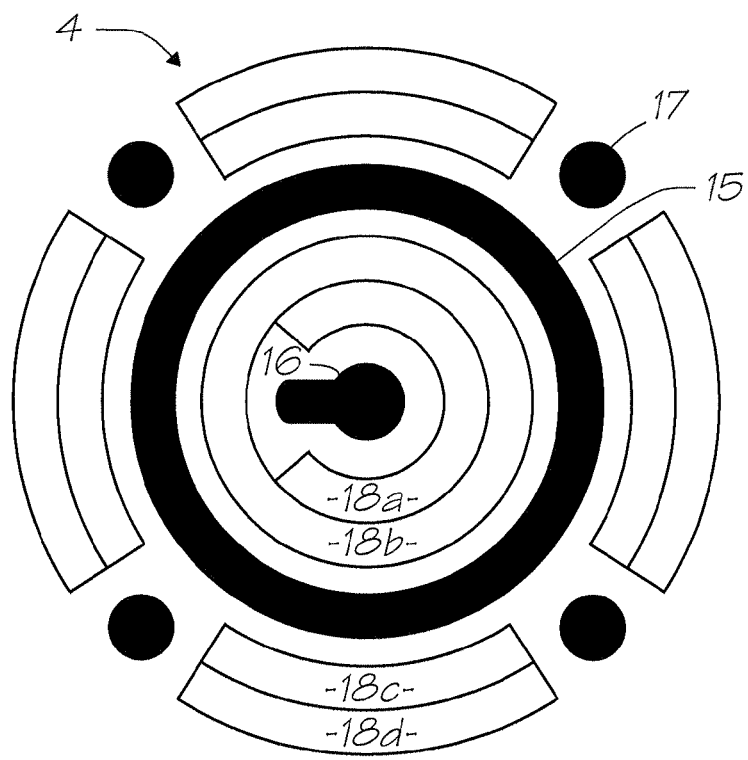
FIG. 5A is a plan view showing a structure of a netpage tag.

The physical representation of the tag, shown in FIG. 5a, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag may include a plurality of target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 5B:
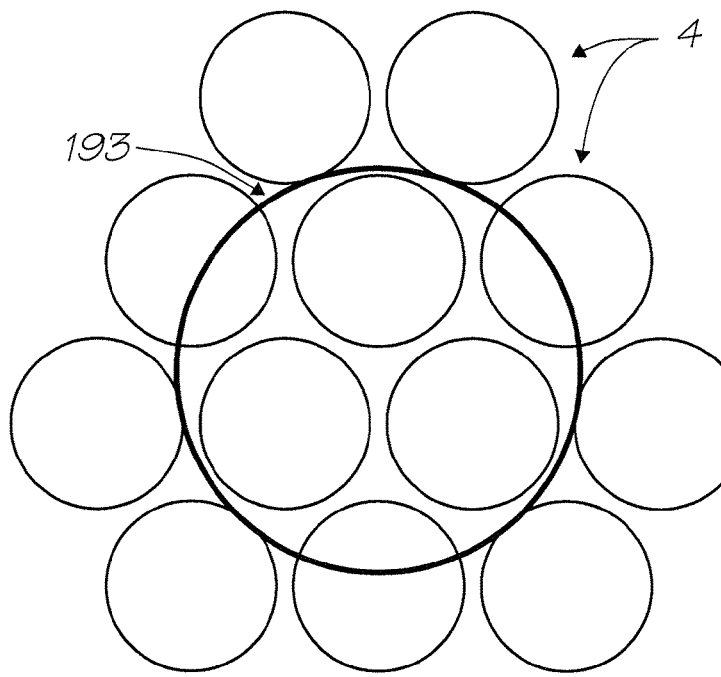
FIG. 5B is a plan view showing a relationship between a set of the tags shown in FIG. 5a and a field of view of a netpage sensing device in the form of a netpage pen.

Thus, if a tag has a circular shape, the minimum diameter of the sensor field of view is obtained when the tags are tiled on a equilateral triangular grid, as shown in FIG. 5b.

2.4 Tag Image Processing and Decoding

Figure 7:
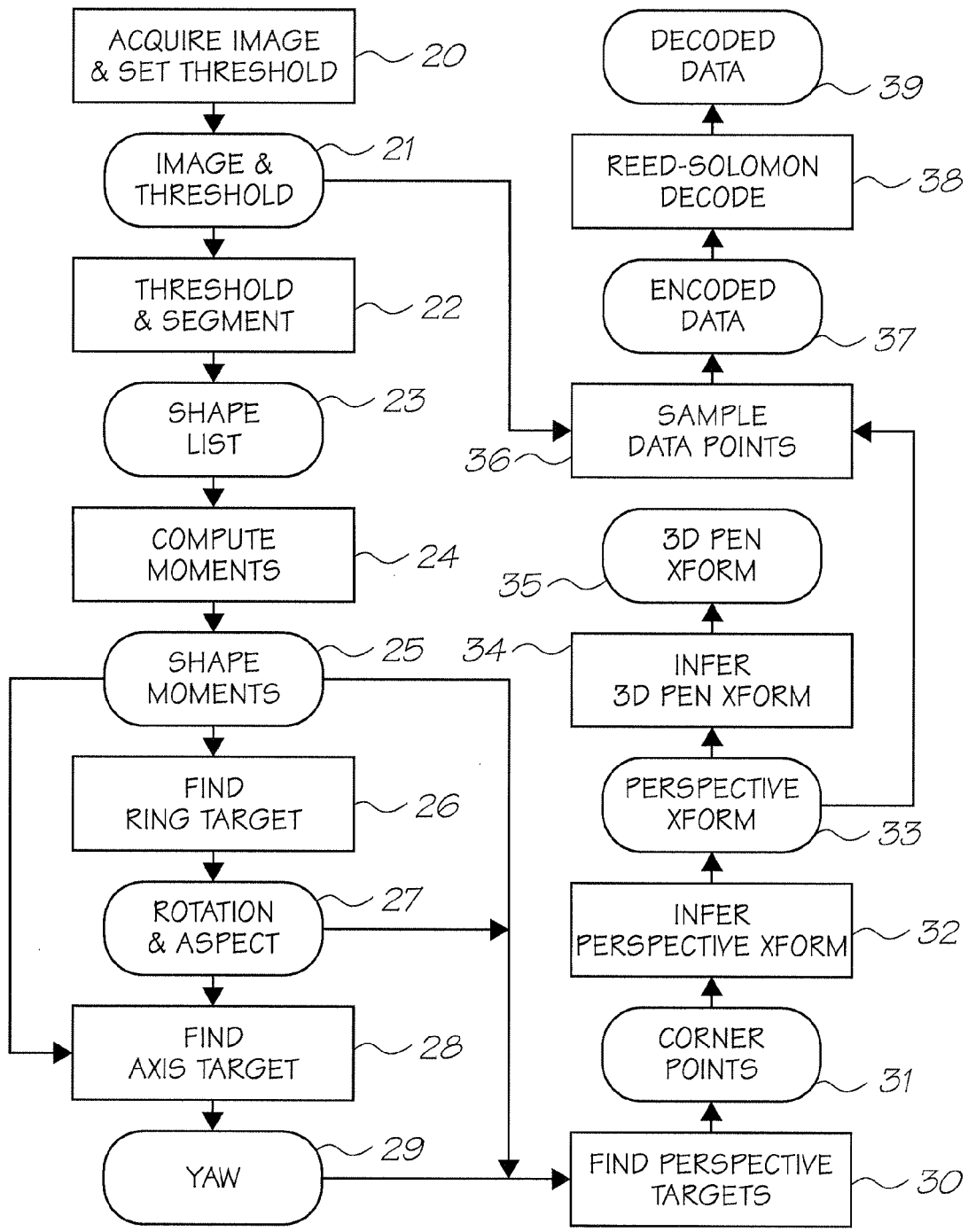
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the image sensor (containing the optical axis of the pen) and the nib (which typically contains the physical axis of the pen). The image sensor is usually offset from the nib.

2.5 Alternative Tag Structures

The tag structure described above is designed to support the tagging of non-planar surfaces where a regular tiling of tags may not be possible. In the more usual case of planar surfaces where a regular tiling of tags is possible, i.e. surfaces such as sheets of paper and the like, more efficient tag structures can be used which exploit the regular nature of the tiling.

Figure 6A:
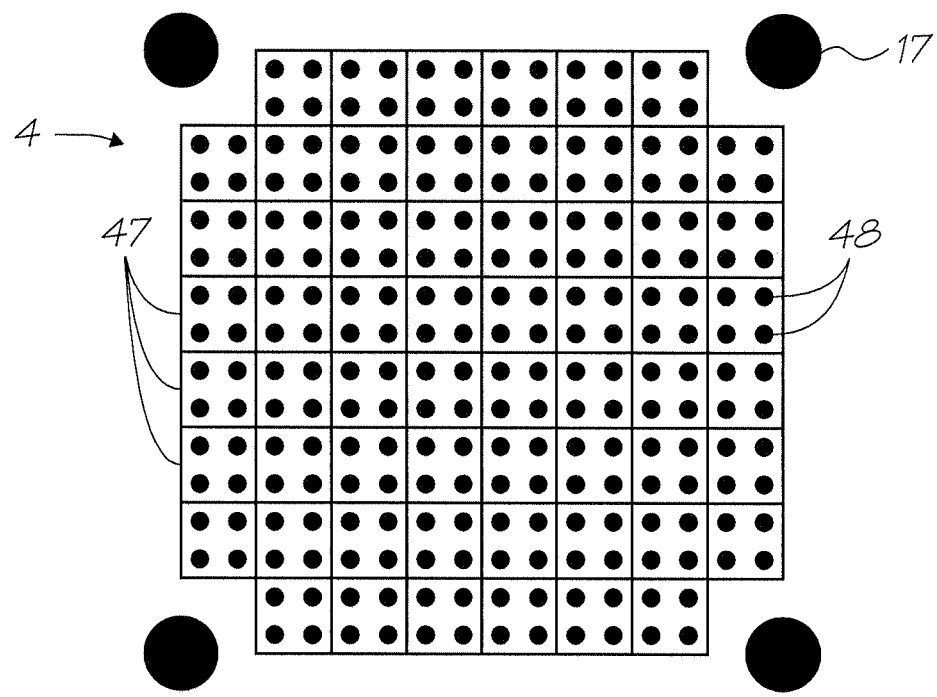
FIG. 6A is a plan view showing an alternative structure of a netpage tag.
Figure 6B:
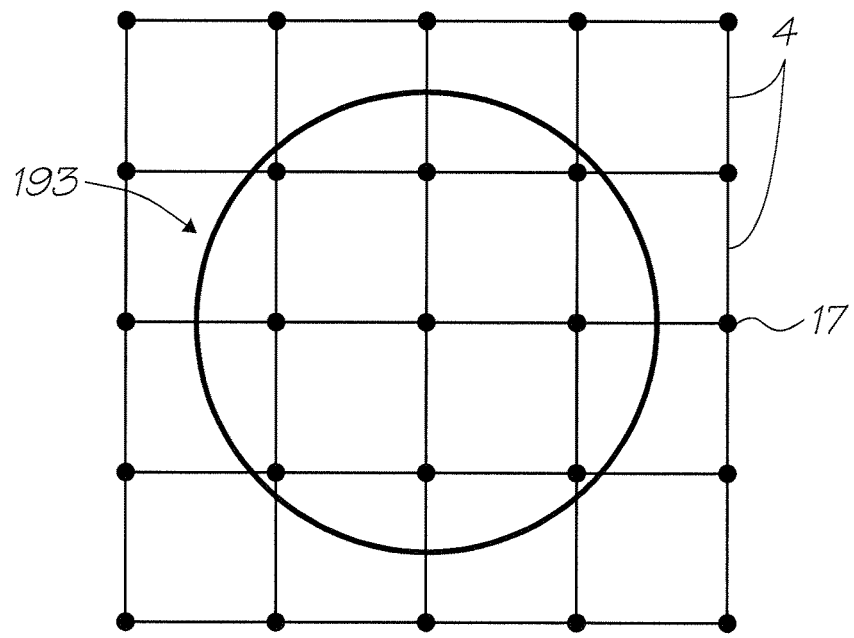
FIG. 6B is a plan view showing a relationship between a set of the tags shown in FIG. 6a and a field of view of a netpage sensing device in the form of a netpage pen.
Figures 6C, 6D:
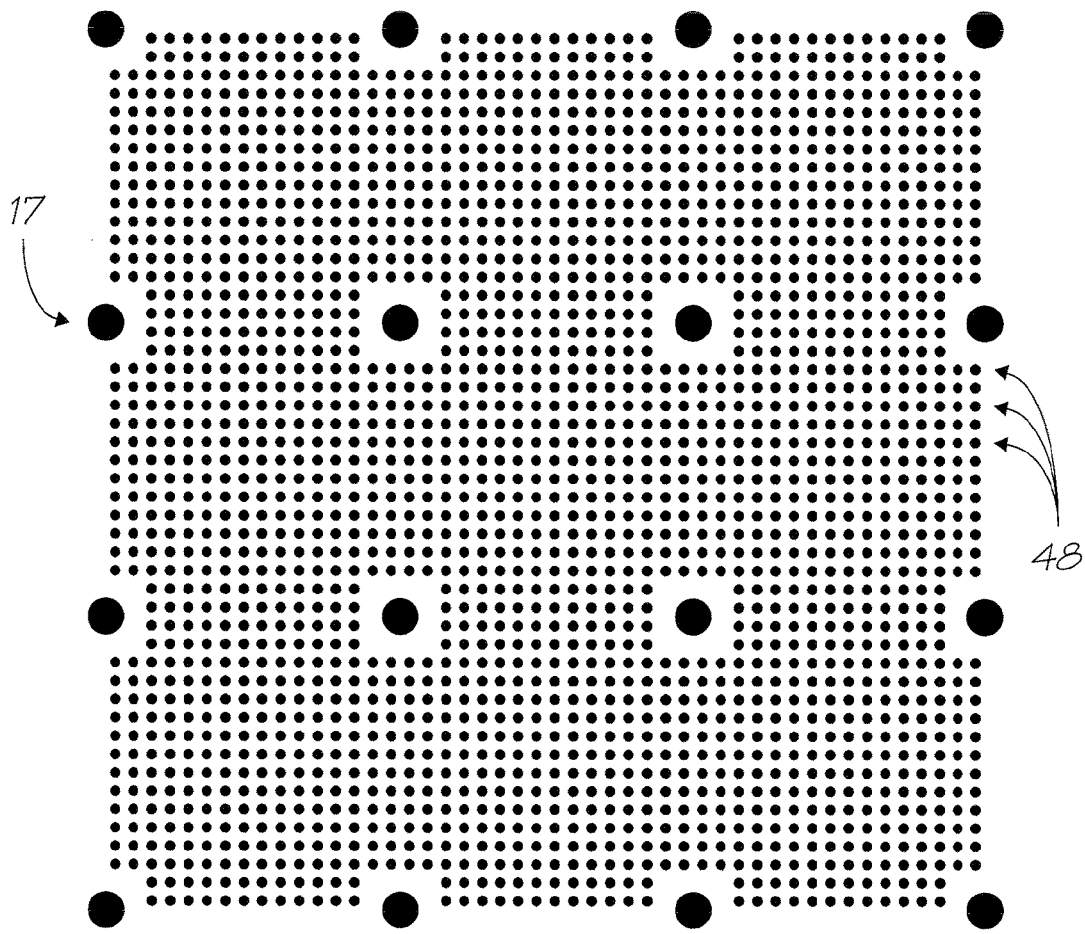

FIG. 6a shows a square tag 4 with four perspective targets 17. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 6b and 6c. FIG. 6b shows a square tiling of 16 tags and the corresponding minimum field of view 193, which must span the diagonals of two tags. FIG. 6c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described in section 1.2.4 above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 6d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Additional tag structures are disclosed in U.S. Pat. No. 6,929,186 ("Orientation-indicating machine-readable coded data") filed by the applicant or assignee of the present invention and the contents of which is herein incorporated by reference.

2.6 Tag Map

Decoding a tag typically results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian (x-y) coordinates or polar coordinates, depending on the surface type on which it appears. The tag ID structure is dictated by and known to the tag map, and tag IDs associated with different tag maps may therefore have different structures.

With the tagging scheme described above, the tags usually function in cooperation with associated visual elements on the netpage. These function as user interactive elements in that a user can interact with the printed page using an appropriate sensing device in order for tag data to be read by the sensing device and for an appropriate response to be generated in the netpage system.

Additionally (or alternatively), decoding a tag may be used to provide orientation data indicative of the yaw of the pen relative to the surface. The orientation data may be determined using, for example, the orientation axis 16 described above (Section 2.3) or orientation data embedded in the tag data (Section 2.5).

3 Document and Page Descriptions

Figure 12:
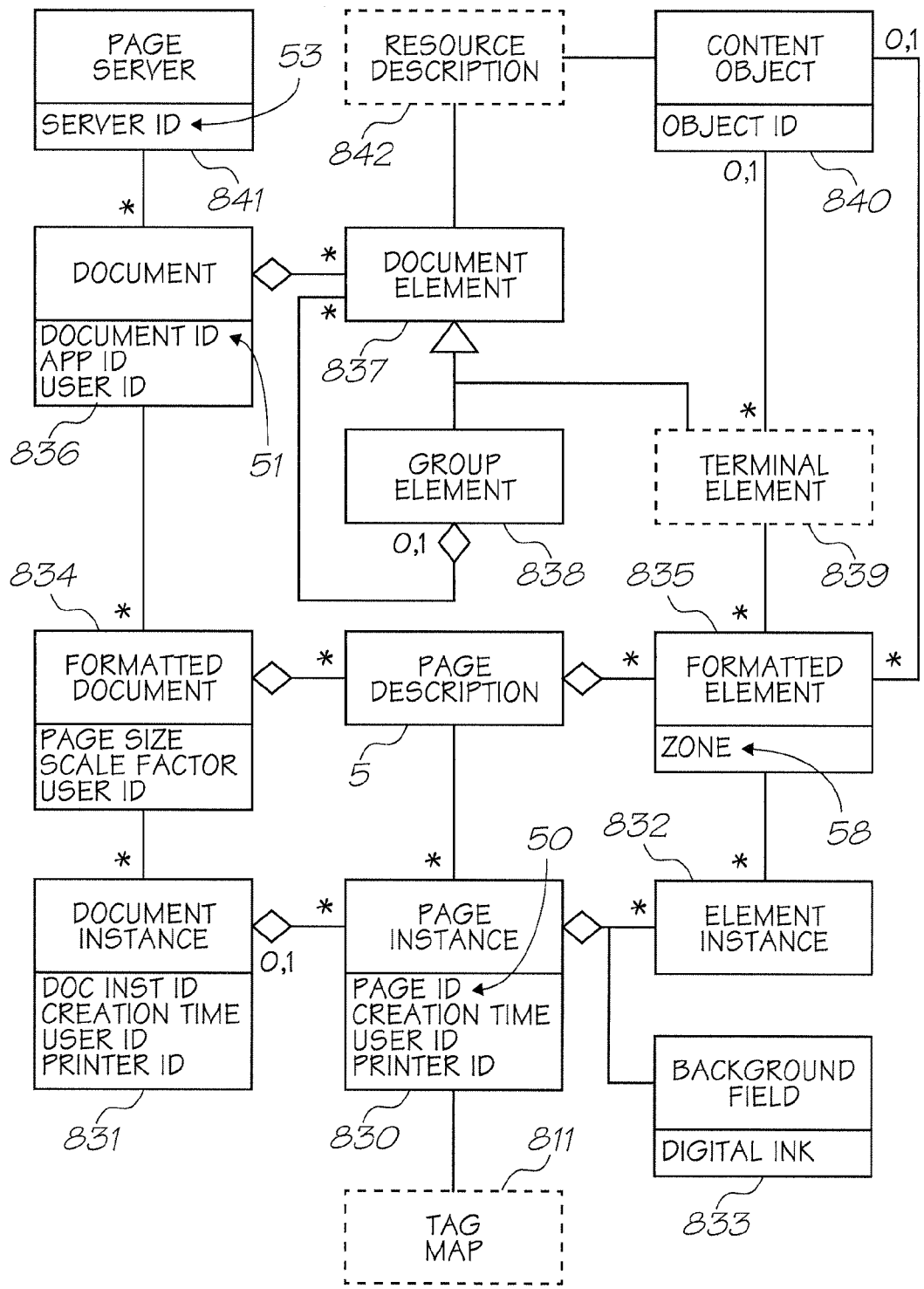
FIG. 12 is a schematic view of a document and page description class diagram.
Figure 13:
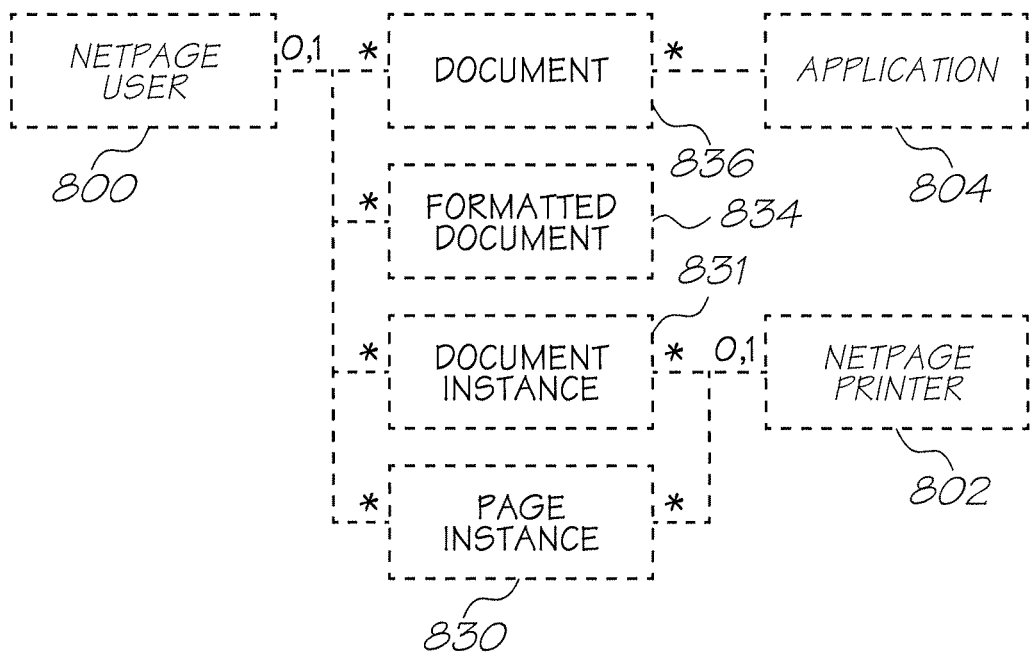
FIG. 13 is a schematic view of a document and page ownership class diagram.

A preferred embodiment of a document and page description class diagram is shown in FIGS. 12 and 13.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a copy of a document to be printed without being forced to accept the source document's specific format. The user or a printing press may be requesting a copy for a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 14:
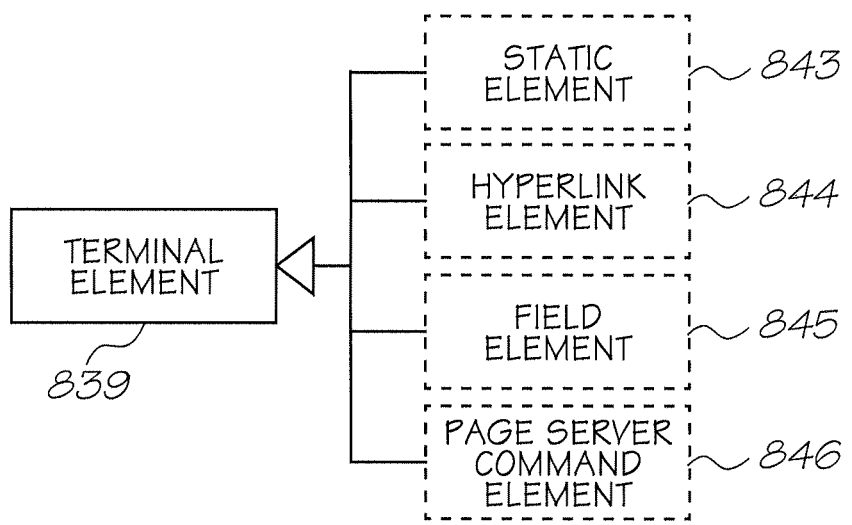
FIG. 14 is a schematic view of a terminal element specialization class diagram.

A terminal element 839 can be a visual element or an input element. A visual element can be a static element 843 or a dynamic element 846. An input element may be, for example, a hyperlink element 844 or a field element 845, as shown in FIG. 14. Other types of input element are of course possible, such a input elements, which select a particular mode of the pen 101.

A page instance has a background field 833 which is used to record any digital ink captured on the page which does not apply to a specific input element.

In the preferred form of the invention, a tag map 811 is associated with each page instance to allow tags on the page to be translated into locations on the page.

4 The Netpage Network

In one embodiment, a netpage network consists of a distributed set of netpage page servers 10, netpage registration servers 11, netpage ID servers 12, netpage application servers 13, and netpage relay devices 601 connected via a network 19 such as the Internet, as shown in FIG. 3.

The netpage registration server 11 is a server which records relationships between users, pens, printers and applications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage relays 601 send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage relay 601 uses the Internet Distributed Name System (DNS), or similar, to resolve a netpage page ID 50 into the network address of the netpage page server 10 handling the corresponding page instance.

A netpage application server 13 is a server which hosts interactive netpage applications.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

5 The Netpage Pen

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). A pen 101 is described herein, although it will be appreciated that clickers and pointers may have similar features. The pen 101 uses its embedded controller 134 to capture and decode netpage tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen may be encrypted and wirelessly transmitted to the printer (or base station), the printer or base station interpreting the data with respect to the (known) page structure.

Figure 11:
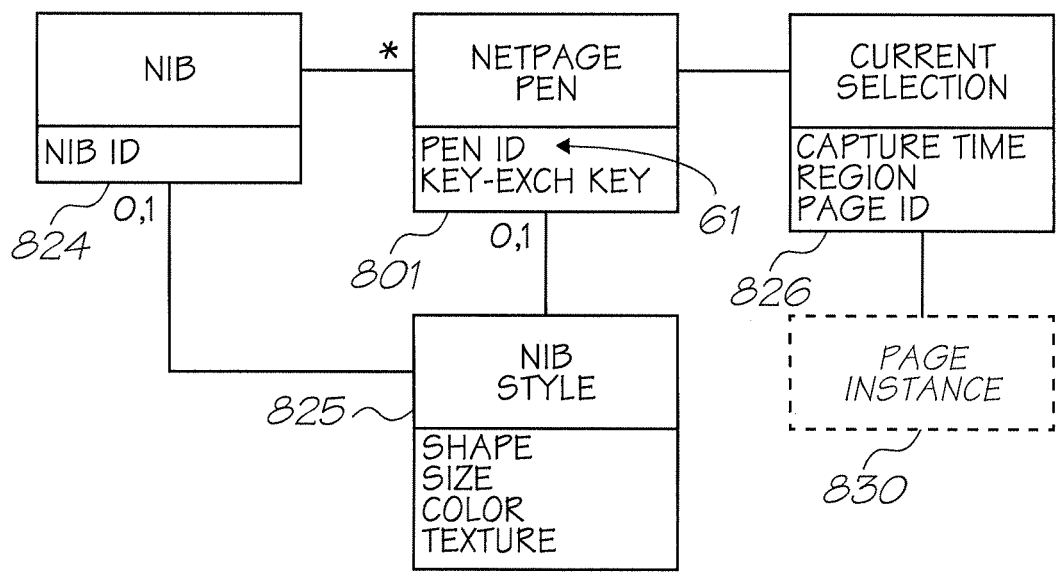
FIG. 11 is a schematic view of a pen class diagram.

The preferred embodiment of the netpage pen 101 operates both as a normal marking ink pen and as a non-marking stylus (i.e. as a pointer). The marking aspect, however, is not necessary for using the netpage system as a browsing system, such as when it is used as an Internet interface. Each netpage pen is registered with the netpage system and has a unique pen ID 61. FIG. 11 shows the netpage pen class diagram, reflecting pen-related information maintained by a registration server 11 on the netpage network.

When the nib is in contact with a netpage, the pen determines its position and orientation relative to the page. The nib is attached to a force sensor, and the force on the nib is interpreted relative to a threshold to indicate whether the pen is "up" or "down". This allows an interactive element on the page to be 'clicked' by pressing with the pen nib, in order to request, say, information from a network. Furthermore, the force may be captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

The pen 101 may have one or more buttons 209. As described in U.S. application Ser. No. 11/672,950 filed on Feb. 8, 2007 (the contents of which is herein incorporated by reference), the button(s) may be used to determine a mode or behavior of the pen, which, in turn, determines how a stroke or, more generally, interaction data is interpreted by the page server 10.

Whenever the pen is within range of a relay device 601 with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is typically wireless and transmits digital ink to the relay device 601 via a short-range radio link. The transmitted digital ink is encrypted for privacy and security and packetized for efficient transmission, but is always flushed on a pen-up event to ensure timely handling in the printer.

When the pen is out-of-range of a relay device 601 it buffers digital ink in internal memory, which has a capacity of over ten minutes of continuous handwriting. When the pen is once again within range of a relay device, it transfers any buffered digital ink.

A pen can be registered with any number of relay devices, but because all state data resides in netpages both on paper and on the network, it is largely immaterial which relay device a pen is communicating with at any particular time.

One embodiment of the pen is described in greater detail in Section 7 below, with reference to FIGS. 8 to 10.

6 Netpage Interaction

The netpage relay device 601 receives data relating to a stroke from the pen 101 when the pen is used to interact with a netpage 1. The coded data 3 of the tags 4 is read by the pen when it is used to execute a movement, such as a stroke. The data allows the identity of the particular page to be determined and an indication of the positioning of the pen relative to the page to be obtained. Interaction data, typically comprising the page ID 50 and at least one position of the pen, is transmitted to the relay device 601, where it resolves, via the DNS, the page ID 50 of the stroke into the network address of the netpage page server 10 which maintains the corresponding page instance 830. It then transmits the stroke to the page server. If the page was recently identified in an earlier stroke, then the relay device may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register may be indicated by the lack of response from the pen's "ok" LED.

Hyperlinks and form fields are two kinds of input elements, which may be contained in a netpage page description. Input through a form field can also trigger the activation of an associated hyperlink. These types of input elements are described in further detail in the above-identified patents and patent applications, the contents of which are herein incorporated by cross-reference.

7 Detailed Netpage Pen Description

7.1 Pen Mechanics

Figure 8:
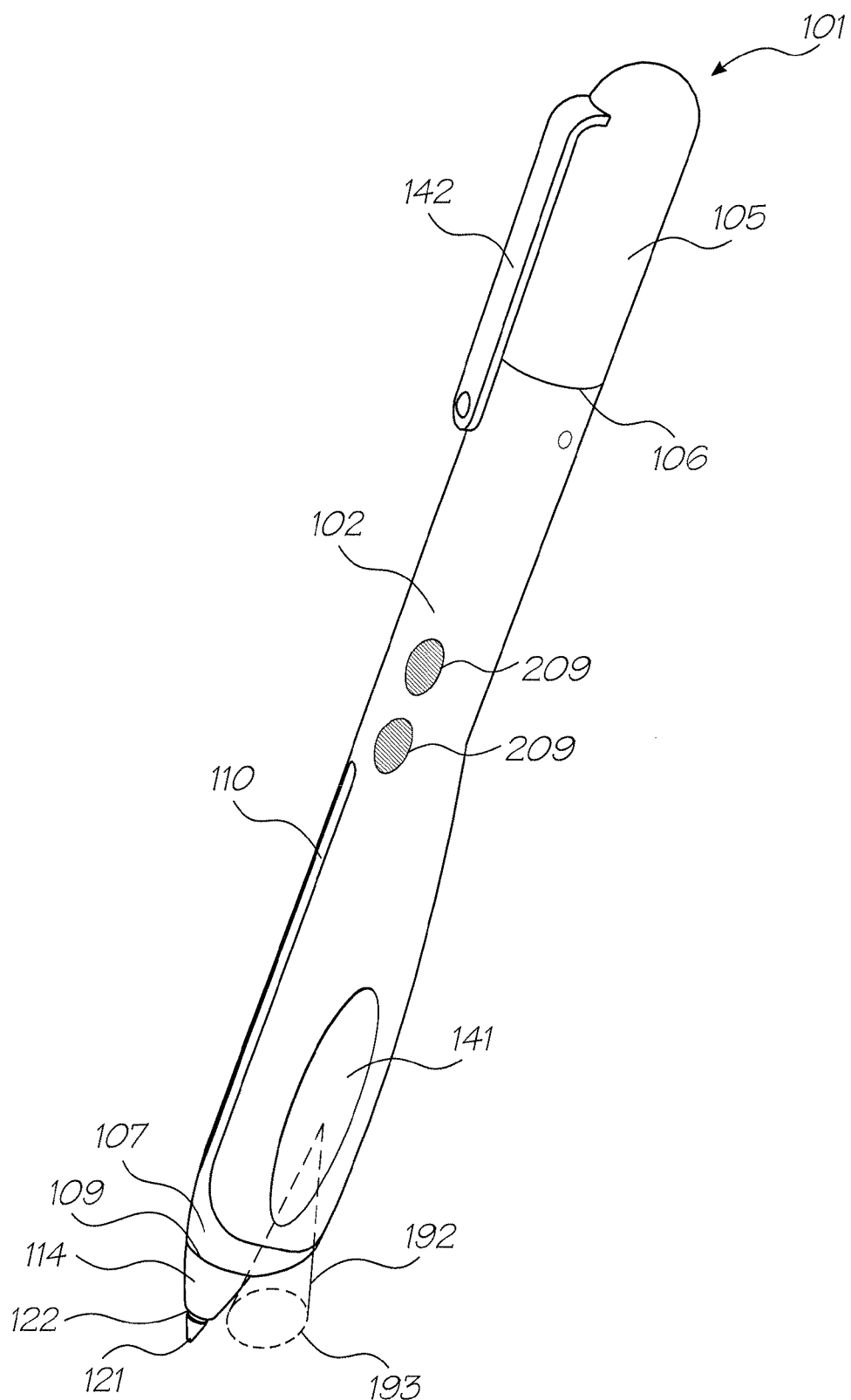
FIG. 8 is a perspective view of a netpage pen and its associated tag-sensing field-of-view cone.
Figure 9:
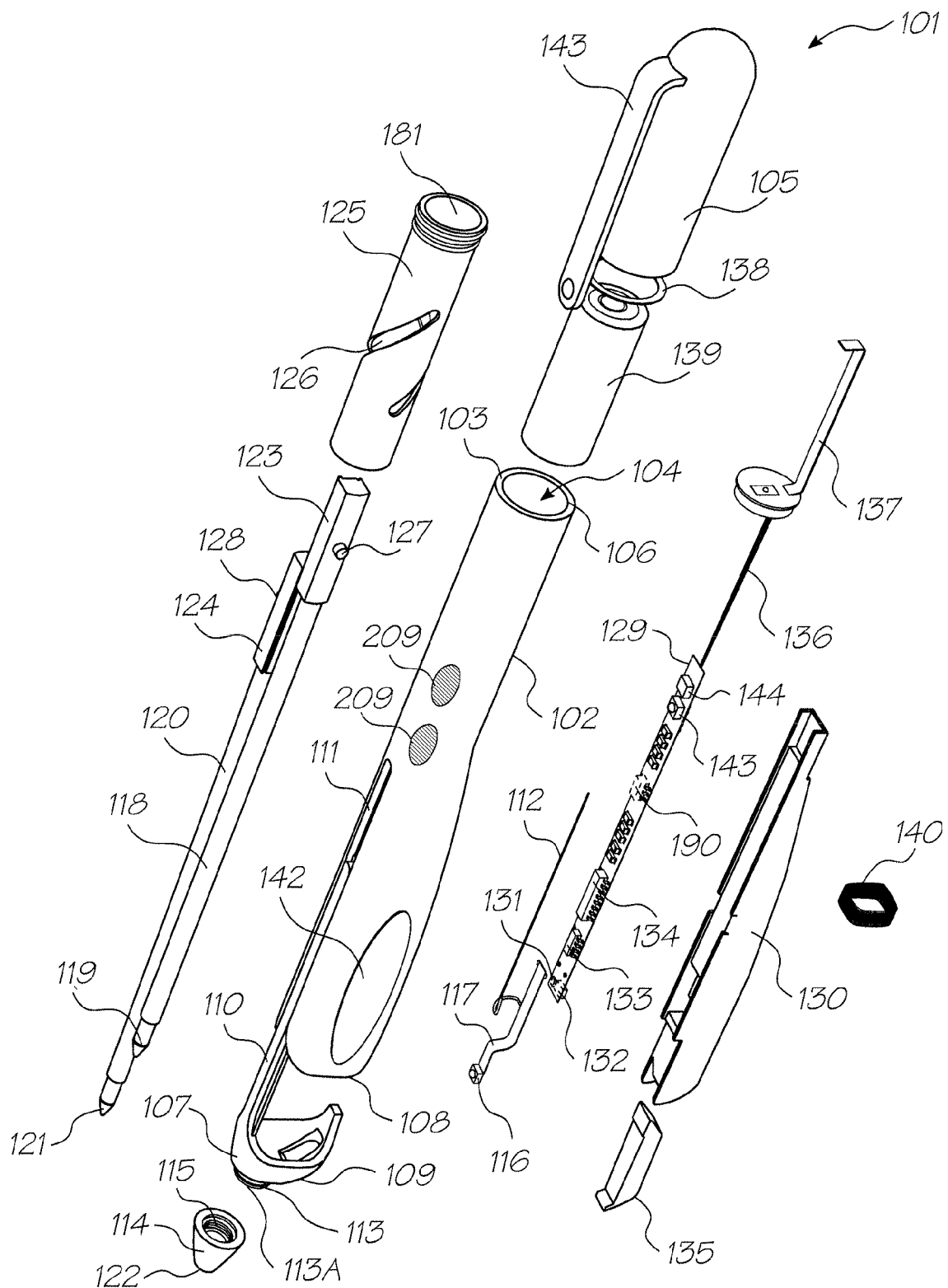
FIG. 9 is a perspective exploded view of the netpage pen shown in FIG. 8.
Figure 10:
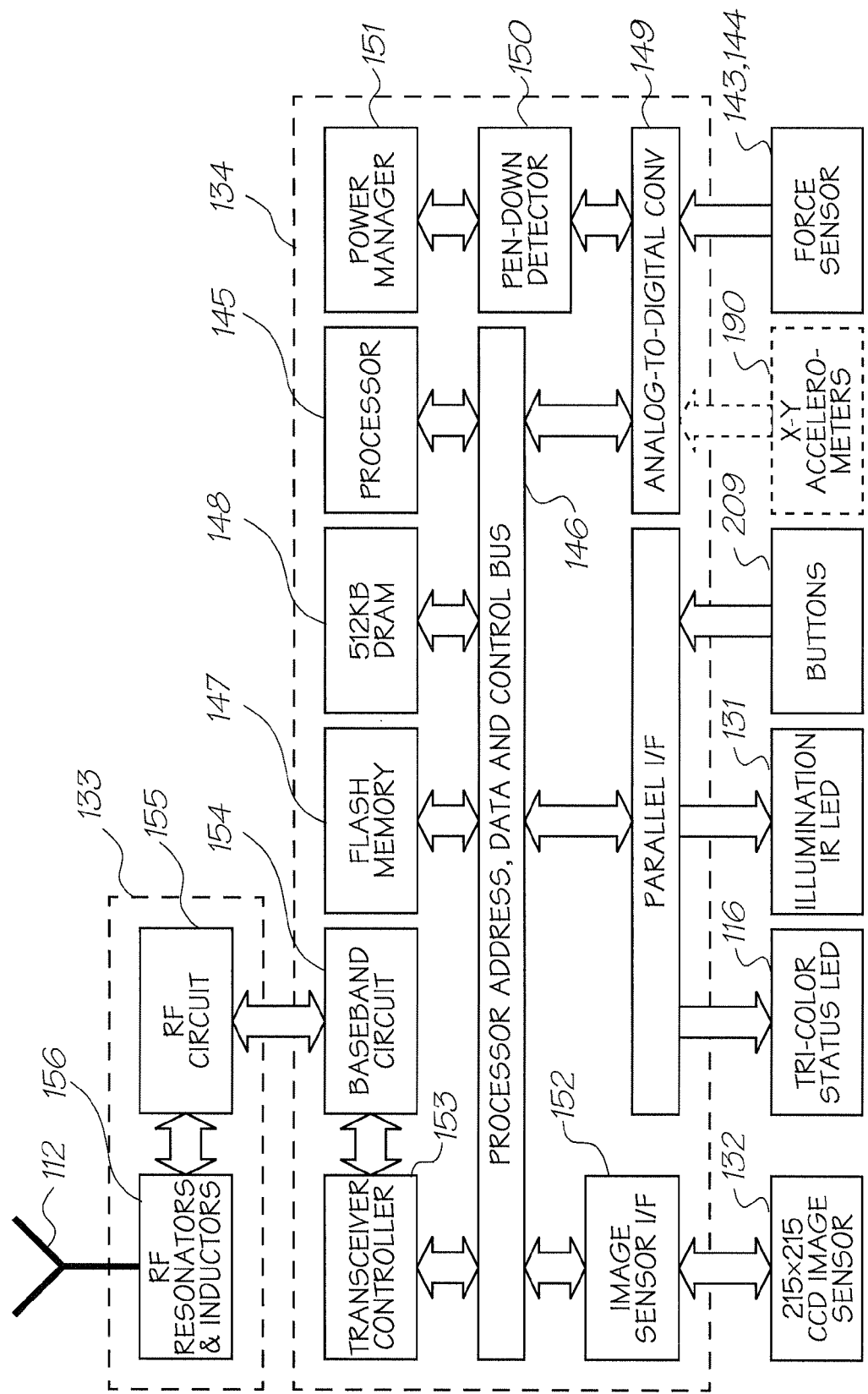
FIG. 10 is a schematic block diagram of a pen controller for the netpage pen shown in FIGS. 8 and 9.

Referring to FIGS. 8 and 9, the pen, generally designated by reference numeral 101, includes a housing 102 in the form of a plastics moulding having walls 103 defining an interior space 104 for mounting the pen components. Mode selector buttons 209 are provided on the housing 102. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;
Ink cartridge 118 nib 119 out; and
Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

7.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation (yaw) of the pen using an orientation indicator in the imaged tag, and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a relay device 601, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

In Applicant's U.S. Pat. No. 6,870,966, the contents of which is incorporated herein by reference, a pen 101 having an interchangeable ink cartridge nib and stylus nib was described. Accordingly, and referring to FIG. 27, when the pen 101 connects to the computing system, the controller 134 notifies the system of the pen ID, nib ID 175, current absolute time 176, and the last absolute time it obtained from the system prior to going offline. The pen ID allows the computing system to identify the pen when there is more than one pen being operated with the computing system.

The nib ID allows the computing system to identify which nib (stylus nib 121 or ink cartridge nib 119) is presently being used. The computing system can vary its operation depending upon which nib is being used. For example, if the ink cartridge nib 119 is being used the computing system may defer producing feedback output because immediate feedback is provided by the ink markings made on the surface. Where the stylus nib 121 is being used, the computing system may produce immediate feedback output.

Since a user may change the nib 119, 121 between one stroke and the next, the pen 101 optionally records a nib ID for a stroke 175. This becomes the nib ID implicitly associated with later strokes.

Cartridges having particular nib characteristics may be interchangeable in the pen. The pen controller 134 may interrogate a cartridge to obtain the nib ID 175 of the cartridge. The nib ID 175 may be stored in a ROM or a barcode on the cartridge. The controller 134 notifies the system of the nib ID whenever it changes. The system is thereby able to determine the characteristics of the nib used to produce a stroke 175, and is thereby subsequently able to reproduce the characteristics of the stroke itself.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

7.3 Alternative Motion Sensor

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke may not be known, only relative positions within a stroke are calculated. Although position integration accumulates errors in the sensed acceleration, accelerometers typically have high resolution, and the time duration of a stroke, over which errors accumulate, is short.

It will be appreciated that a number of alternative (or additional) motion sensors may be employed in a Netpage pen 101. These typically either measure absolute displacement or relative displacement. For example, an optical mouse that measures displacement relative to an external grid (see U.S. Pat. No. 4,390,873 and U.S. Pat. No. 4,521,772) measures absolute displacement, whereas a mechanical mouse that measures displacement via the movement of a wheel or ball in contact with the surface (see U.S. Pat. No. 3,541,541 and U.S. Pat. No. 4,464,652) measures relative displacement because measurement errors accumulate. An optical mouse that measures displacement relative to surface texture (see U.S. Pat. No. 6,631,218, U.S. Pat. No. 6,281,882, U.S. Pat. No. 6,297,513 and U.S. Pat. No. 4,794,384), measures relative displacement for the same reason. Motion sensors based on point interferometry (see U.S. Pat. No. 6,246,482) or acceleration (see U.S. Pat. No. 4,787,051) also measure relative displacement. The contents of all US patents identified in the preceding paragraph relating to motion sensors are herein incorporated by reference.

7.4 GUI Control

As discussed in U.S. application Ser. No. 11/672,950 filed on Feb. 8, 2007 (the contents of which is herein incorporated by reference), a Netpage pen 101 can be used to generate cursor control commands (i.e. typically mouse events) to allow seamless transitions between paper interactions and on-screen interactions.

A computer system associated with the display device may receive cursor control data (in the form of relative motion data) directly from the pen 101, with the pen performing the necessary processing to generate the cursor control data from the interaction data. Alternatively, the computer system may receive interaction data as usual from the pen 101, and then generate cursor control commands for an associated display device. Alternatively, the computer system may be a remote server which receives interaction data from the Netpage pen 101 and transmits cursor control commands to a display device near the user (e.g. mobile phone). Any of these system architectures may support cursor control, although generation of cursor control commands in the pen is generally preferred.

As discussed in U.S. application Ser. No. 11/672,950, a cursor control behaviour can be selected in various ways, including via a momentary or persistent mode switch. Alternatively, cursor control behaviour may also be automatically selected in the absence of a Netpage tag pattern, if the Netpage pen 101 incorporates a motion sensor that functions in the absence of a tag pattern.

When positions generated by a Netpage pen 101 are intrinsically absolute, such as when generated at least partially with reference to a Netpage tag pattern, then such positions can be trivially converted into absolute cursor control commands. The extent of the physical surface with which the sensing device is interacting is ideally mapped to the extent of a display device for the purposes of translating sensing device positions into cursor control commands.

However, cursor control commands commonly specify changes in position rather than absolute positions—i.e. they are relative position changes. Absolute positions generated by a Netpage pen 101 by reading tags 4 may be trivially converted into relative cursor control commands. The relative scale of physical displacements of the Netpage reader and corresponding screen displacements can be specified as a matter of user preference, as well as whether the mapping is absolute or relative.

Although relative displacements of the pen 101 may be readily calculated from absolute motion data, the implementation of cursor control behaviour from absolute positions is problematic in practice. In order for cursor control behaviour to appear 'natural' from a user's perspective, cursor movements on a screen should always follow substantially the movement of the pen 101 i.e. a left pen movement moves the on-screen cursor to the left, an up pen movement moves the on-screen cursor upwards etc. If a surface is orientated in the same way as a displayed page, then on-screen cursor movements naturally reflect movement of the pen 101. However, if the surface is upside down, then the on-screen cursor movements will be confusing and unnatural for the user i.e. a left pen movement would move the on-screen cursor to the right.

Since users are not accustomed to orienting their traditional mousepads in a certain way, they equally would not expect to orient their Netpage-tagged surface in a certain way in order to invoke natural cursor-control behaviour. In other words, it is desirable that the surface and pen 101 should invoke natural mouse behaviour irrespective of how the surface is oriented.

This problem is solved by making used of the orientation information contained in the Netpage tags 4. As explained above in Sections 2.3 to 2.5, the yaw of the pen 101 relative to the surface may be calculated by making use of this orientation information. If orientation data as well as absolute motion data is received by a computer system, then the computer system can determine movement of the pen 101 relative to itself by taking into account the yaw of the pen relative to the surface. Hence, movement of the pen, from a user's perspective, is substantially translated into a corresponding on-screen cursor movement. In this way, the pen 101 may be used to control naturally the movement of the cursor, irrespective of the orientation of the surface.

Of course, when positions generated by a Netpage pen 101 are intrinsically relative, such as when they are generated using a relative motion sensing mechanism (e.g. accelerometers, mechanical mouse, optical mouse etc), then they map naturally to relative cursor control commands, again with a (potentially user-specified) scale factor.

Cursor control is a subset of graphical user interface (GUI) input and control in general, including functions such as:
  scrolling
  web browser back/forward
  page up/down etc.
  cut/copy/paste
  tab between GUI applications launch specific GUI application (word processor, e-mail, web browser, etc.)
volume control (up/down/mute)
log off, sleep
keyboard entry in general Scrolling can be supported in the conventional way via a scroll wheel on the Netpage pen 101. It can also be provided implicitly as part of a cursor control behaviour, when motion sensing at least partially occurs with reference to a Netpage tag pattern, by reserving part of the extent of each printed Netpage tag pattern as a scroll region. For example, the right-hand couple of inches of each printed Netpage might be reserved for vertical scrolling, and the bottom couple of inches might be reserved for horizontal scrolling. This scroll region may be active when it is determined that the pen 101 is operating in a cursor mode (for example, by a mode switch on the pen).

Scrolling, like cursor control, can be absolute or relative, and can be specified as a matter of user preference. As an alternative to separate vertical and horizontal scrolling areas, the dominant direction of the user's scroll gesture within a single scroll region, relative to the orientation of the tag pattern, can also be used to distinguish vertical from horizontal scrolling. In order to allow diagonal scrolling, a threshold can be imposed on the vertical and horizontal components of the user's gesture to prevent inadvertent diagonal scrolling. As an alternative to reserving a scroll region, one or two scroll mode selection switches can be provided on the pen 101.

Figure 15:
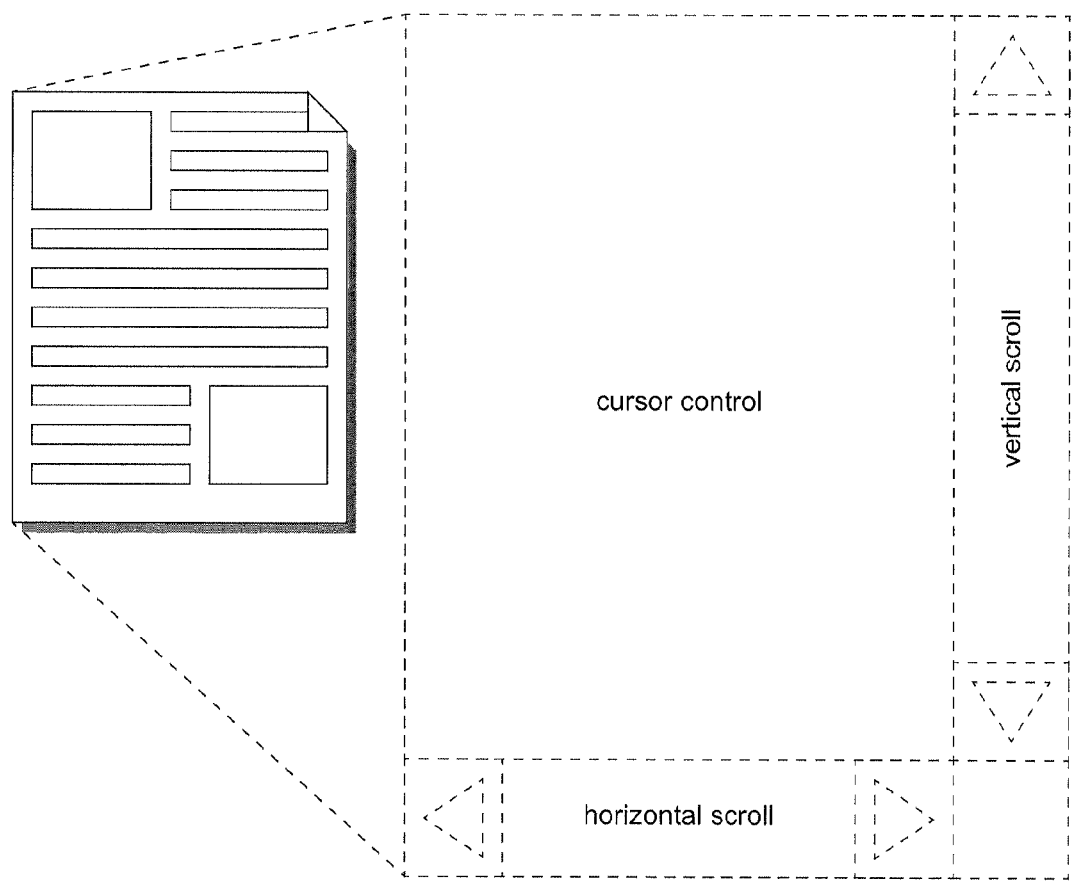
FIG. 15 shows cursor control and scroll functions mapped onto an arbitrary page.

FIG. 15 shows cursor control and scrolling functions mapped onto an arbitrary Netpage tagged page. The functions are only operative when the Netpage pen's cursor control behaviour is selected. The user readily learns from experience that if the pen's cursor control behaviour is selected then cursor control and scrolling actions may be performed via certain regions of any Netpage, even though there may be no explicit visual indication of this functionality in the visible content of the page. For example, scroll regions along a right-hand and bottom edge region may be standard for any Netpage. These scroll regions would be active only in the cursor mode.

Figure 16:
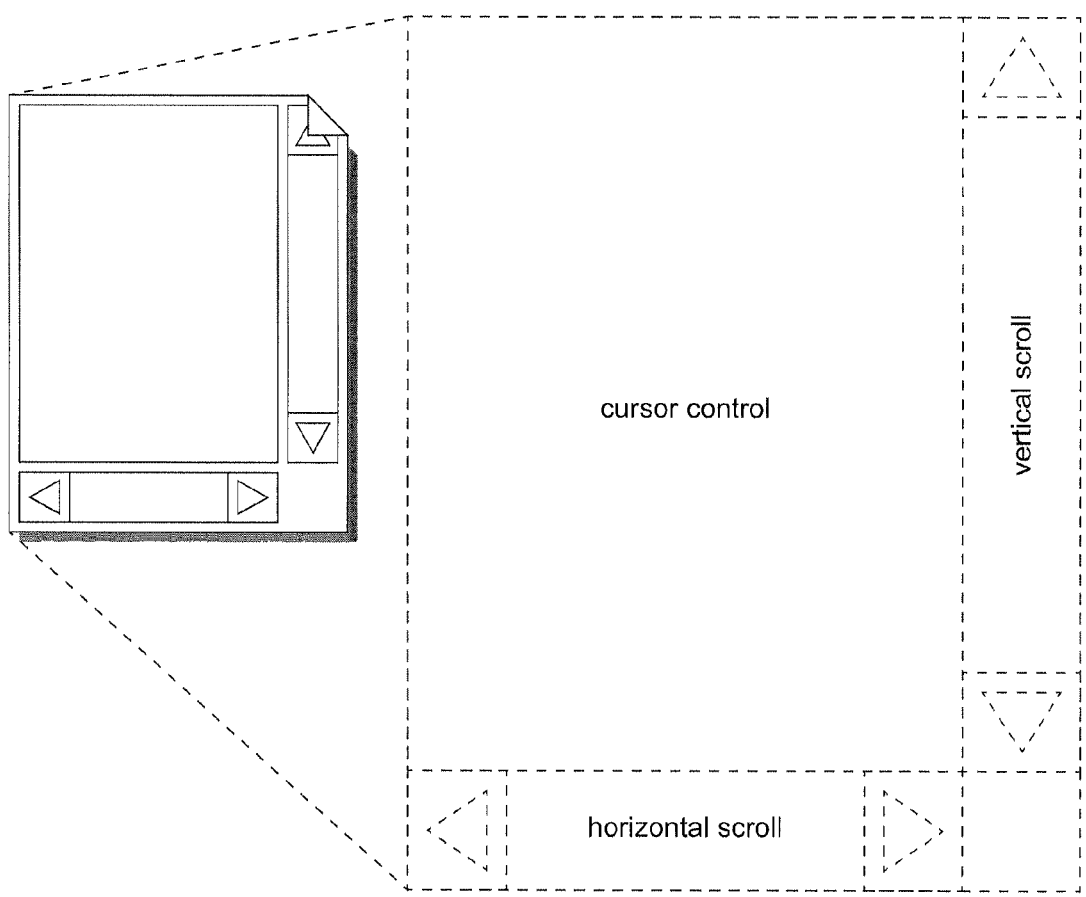
FIG. 16 shows an explicit cursor control and scroll page.
Figure 17:
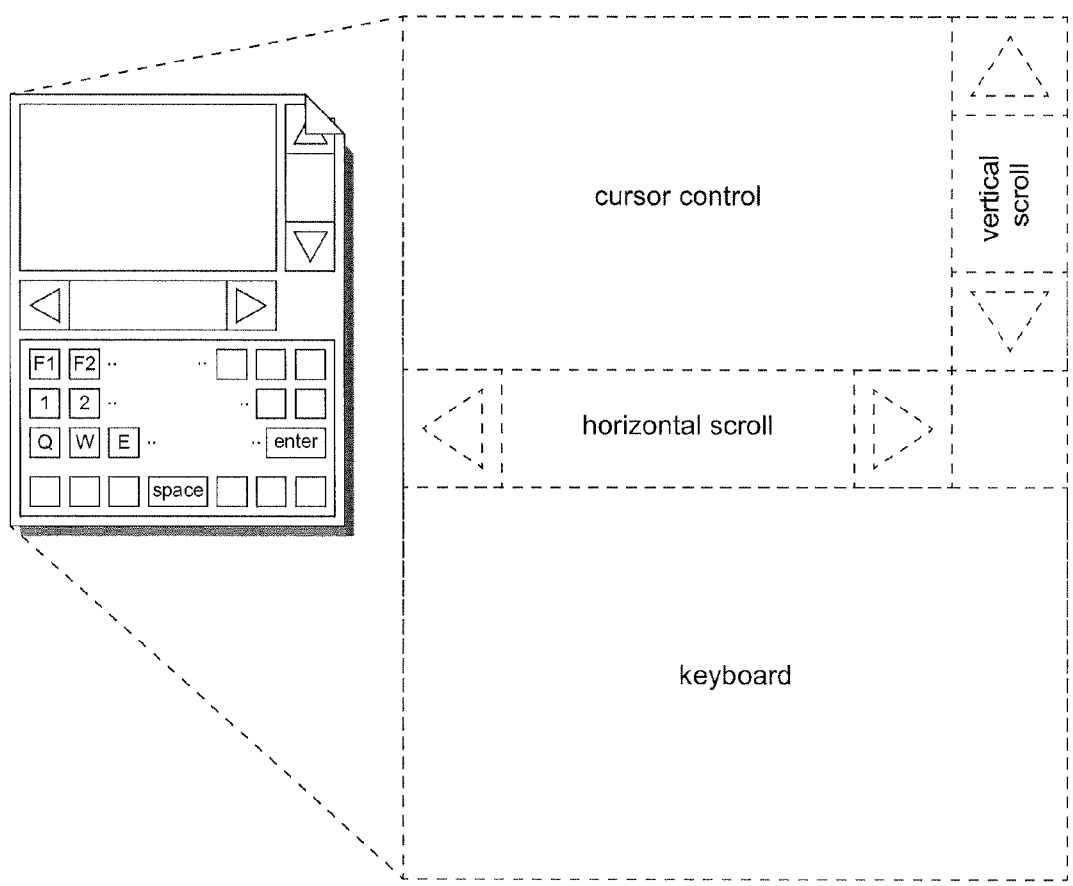
FIG. 17 shows an explicit cursor control, scroll and keyboard page.

FIG. 16 shows cursor control and scrolling functions explicitly mapped onto a page with a matching visual layout. Hence, the page shown in FIG. 16 is a dedicated cursor control page, specifically tailored for GUI control, including cursor control and scrolling actions. FIG. 17 shows cursor control, scrolling functions and keyboard keys explicitly mapped onto a page with a matching visual layout. In the explicitly mapped cases the functions are self-selecting, and so can be operative in any pen behaviour.

Any function or key input can also be generated via a suitable Netpage tagged surface, either via tags specifically coded to indicate corresponding functions or keys, or via a page description that indicates corresponding functions or keys in the usual way. The former has the advantage that the input can be identified without consulting the page description 5. This allows the user's relay device 601, which may commonly be the user's display device, to capture such input without recourse to the Netpage server 10. In the latter case any function or key input generated by the server with reference to the page description can be routed to the user's display device via the netpage architecture (see FIG. 1 and U.S. Patent Publication No. 2006/025175, the contents of which is herein incorporated by reference). This has the advantage that it supports a display device that is separate from the relay device.

Printed controls can also be provided for selecting one-shot or persistent modes, such as a scrolling mode. Printed controls may be selected via a typical netpage interaction, whereby a user selects an interactive control element on a page, and this interaction is interpreted as a mode selection in the computer system via the page description.

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for controlling movement of a cursor on a display device, the system comprising:
    a substrate having a position-coding pattern disposed on a surface thereof, the position-coding pattern comprising a plurality of tags, each tag encoding the position of the tag on the surface and a rotational orientation of the surface;
    a sensing device comprising:
        an image sensor for optically imaging tags of the position-coding pattern; and
        a processor configured for:
            generating absolute motion data indicative of movement of the sensing device relative to the surface by determining a plurality of absolute positions of the sensing device relative to the surface using the respective positions of imaged tags;
            generating orientation data indicative of an orientation of the sensing device relative to the substrate using the rotational orientation of the imaged tags;
            using the orientation data to determine the yaw of the sensing device relative to the surface; and
            using the yaw of the sensing device to translate the absolute motion data into relative motion data indicative of movement of the sensing device relative to itself independent of the orientation of the substrate; and
        communication means for communicating the relative motion data to a computer system; and
    the computer system configured for:
        receiving said relative motion data from the sensing device;
        interpreting said relative motion data as cursor movement; and
        generating cursor control commands for said display device.

2. The system of claim 1, wherein the relative motion data is indicative of relative position changes of the sensing device substantially from a perspective of a user, and irrespective of an orientation of said substrate.

3. The system of claim 1, wherein said display device is selected from at least one of:
    a display device associated with the computer system
    a display device integral with the computer system; and
    a display device remote from the computer system.

4. The system of claim 1, wherein said sensing device is operable in a plurality of modes, said plurality including a cursor mode and at least one other mode, and wherein the computer system is further configured for:
    determining that said sensing device is operating in a cursor mode.

5. The system of claim 4, wherein said at least one other mode is selected from the group comprising: a scroll mode; a hyperlinking mode; a searching mode; a content-extraction mode; and a handwriting mode.

6. The system of claim 3, wherein said sensing device further comprises a mode selector, and said communication means further communicates mode data indicative of a condition of the mode selector.

7. The system of claim 6, wherein said mode selector comprises at least one of:
one or more mode buttons operable by a user; and
a sensor for detecting a force exerted by said sensing device on said surface.

8. The system of claim 4, wherein said computer system is configured for retrieving stored mode data indicative of a most recent mode selected for said sensing device.

9. The system of claim 4, wherein said computer system is further configured for:
determining if said sensing device is positioned within a cursor zone of said substrate, said cursor zone being activated by determination of said cursor mode; and
interpreting relative motion of said sensing device only within said cursor zone as said cursor movement.

10. The system of claim 9, wherein said computer system is further configured for:
determining if said sensing device is positioned within a scroll zone of said substrate, said scroll zone being activated by determination of said cursor mode; and
interpreting the interaction of said sensing device within said scroll zone as a scroll action;
scrolling a page displayed on said display device according to said scroll action.

11. The system of claim 10, wherein said computer system is configured for at least one of:
interpreting at least one absolute position of said sensing device within said scroll zone to be indicative of a scroll direction; and
interpreting relative motion of said sensing device within said scroll zone to be indicative of a scroll direction.

12. The system of claim 1, wherein the position-coding pattern is further indicative of an identity of the substrate and the communication means further communicates substrate identity data.

13. The system of claim 12, wherein the substrate is a cursor control substrate and said computer system is configured for using the substrate identity data to retrieve a cursor page description corresponding to said cursor control substrate, said cursor page description comprising a cursor zone within which the interaction of said sensing device is interpreted as said cursor movement.

14. The system of claim 13, wherein said cursor page description comprises a scroll zone within which the interaction of said sensing device is interpreted as a scroll action, and wherein said computer system is configured to scroll a page displayed on said display device according to said scroll action.

15. The system of claim 14, wherein said cursor control substrate has visible markings indicating at least one of: said cursor zone, said scroll zone and a scroll direction.

16. The system of claim 14, wherein said scroll zone is located at an edge region of said substrate.

17. A sensing device for controlling movement of a cursor on a display device, said sensing device comprising:
an image sensor for optically imaging tags of a position-coding pattern disposed on a surface, each tag comprising encoding the position of the tag on the surface and a rotational orientation of the surface; and
a processor configured for:
generating absolute motion data indicative of movement of the sensing device relative to the surface by determining a plurality of absolute positions of the sensing device relative to the surface using the respective positions of imaged tags;
generating orientation data indicative of an orientation of the sensing device relative to the substrate using the rotational orientation of the imaged tags;
using the orientation data to determine the yaw of the sensing device relative to the surface; and
using the yaw of the sensing device to translate the absolute motion data into relative motion data indicative of movement of the sensing device relative to itself independent of the orientation of the substrate; and
communication means for communicating the relative motion data to a computer system, thereby enabling the computer system to generate cursor control commands using the relative motion data for controlling movement of the cursor on the display device.

* * * * *